United States Patent
Iwasaki et al.

[11] Patent Number: 5,873,784
[45] Date of Patent: Feb. 23, 1999

[54] POWER STEERING SYSTEM HAVING A MECHANICAL SAFETY BREAKER

[75] Inventors: Takashi Iwasaki, Susono; Hiroaki Tanaka, Gotenba; Akira Hasegawa, Kakegawa; Kazunori Kagawa, Odawara; Takuya Kondo, Susono, all of Japan

[73] Assignee: Toyota Jidosha Kabushiki Kaisha, Japan

[21] Appl. No.: 831,949

[22] Filed: Apr. 2, 1997

Related U.S. Application Data

[63] Continuation of Ser. No. 319,589, Oct. 7, 1994, abandoned.

[30] Foreign Application Priority Data

| Oct. 25, 1993 | [JP] | Japan | 5-288708 |
| Nov. 2, 1993 | [JP] | Japan | 5-297436 |
| Nov. 2, 1993 | [JP] | Japan | 5-297437 |
| Nov. 9, 1993 | [JP] | Japan | 5-303353 |
| Nov. 29, 1993 | [JP] | Japan | 5-323089 |

[51] Int. Cl.$^6$ ................................................. F16D 9/00
[52] U.S. Cl. ...................... 464/32; 403/2; 403/358
[58] Field of Search .................. 464/30, 32, 902, 464/904; 403/2, 356, 357, 358; 180/443, 444

[56] References Cited

U.S. PATENT DOCUMENTS

| 50,761 | 10/1865 | Wheeler | 403/356 |
| 1,323,172 | 11/1919 | Dover | 403/358 |
| 1,685,098 | 3/1928 | Sklovsky | 464/33 |
| 2,623,765 | 12/1952 | Coquille | 403/356 |
| 2,623,766 | 12/1952 | Coquille | 403/356 |
| 2,821,227 | 1/1958 | Hughes | 403/359 X |
| 2,821,277 | 1/1958 | Hughes | 403/359 X |
| 2,828,161 | 3/1958 | Whitney | 464/33 |
| 3,430,460 | 3/1969 | Hankinson | 464/33 |
| 3,472,046 | 10/1969 | Potter | 464/32 |
| 3,822,953 | 7/1974 | Adelizzi | 403/356 |
| 4,111,568 | 9/1978 | Wing | 403/2 |
| 4,222,246 | 9/1980 | Rongley | 464/30 |
| 4,615,639 | 10/1986 | Seirg | 403/356 |
| 4,676,331 | 6/1987 | Iwaki et al. | 180/444 |
| 4,684,284 | 8/1987 | Bradley | 403/356 X |
| 4,804,057 | 2/1989 | Saeed | 180/444 |
| 4,852,707 | 8/1989 | Ito et al. | 180/444 |
| 4,901,831 | 2/1990 | Ito et al. | 180/444 X |
| 5,183,140 | 2/1993 | Nicoll | 464/30 X |
| 5,293,921 | 3/1994 | Marocco | 464/30 X |

FOREIGN PATENT DOCUMENTS

| 562995 | 12/1957 | France . |
| 596995 | 12/1957 | France ................................ 403/356 |
| B 16284 | 2/1954 | Germany . |
| 61-220968 | 10/1986 | Japan . |
| 61/220968 | 10/1986 | Japan . |
| WO 93/17476 | 9/1993 | WIPO . |

OTHER PUBLICATIONS

Krause, "Konstruktionselemente Der Feinmechanick", Hanser–Verlag, 1989 pp. 136–139, 164–165, 238–239, 346.
G. Niemann, "Maschinenelemente", BD. 1, Springer–Verlag, Berlin, 1975 pp. 72, 372, 373.
Roloff/Matek, "Maschinenelemente", Vieweg–Verlag, Braunschweig, 1974.

*Primary Examiner*—Eileen A. Dunnlillis
*Attorney, Agent, or Firm*—Pillsbury Madison & Sutro, LLP

[57] ABSTRACT

A mechanical safety breaker for disengaging a mechanical connection between two mechanical members at a time when a force transmitted through the connection of the two members exceeds a predetermined value is provided by employing an overload breaker element made of a ceramic. A ceramic breaker element provides a long time stabilized fracture performance particularly when the load applied thereto is of a repetitive nature.

22 Claims, 22 Drawing Sheets

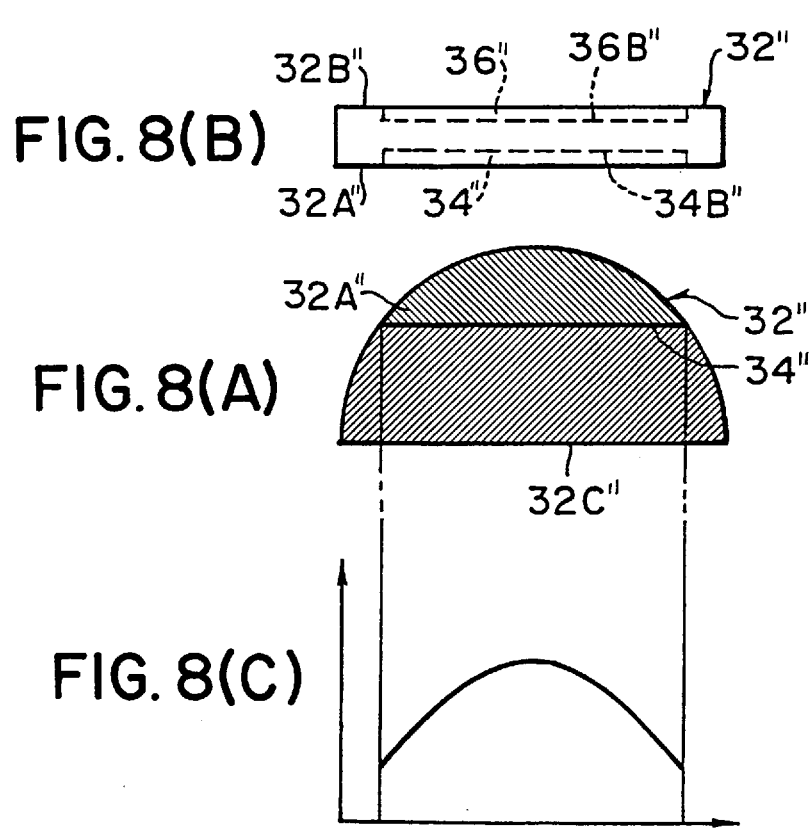

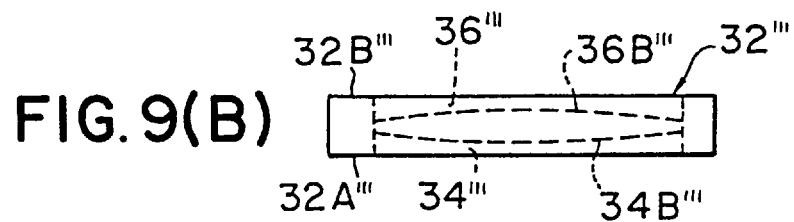
FIG. 9(B)
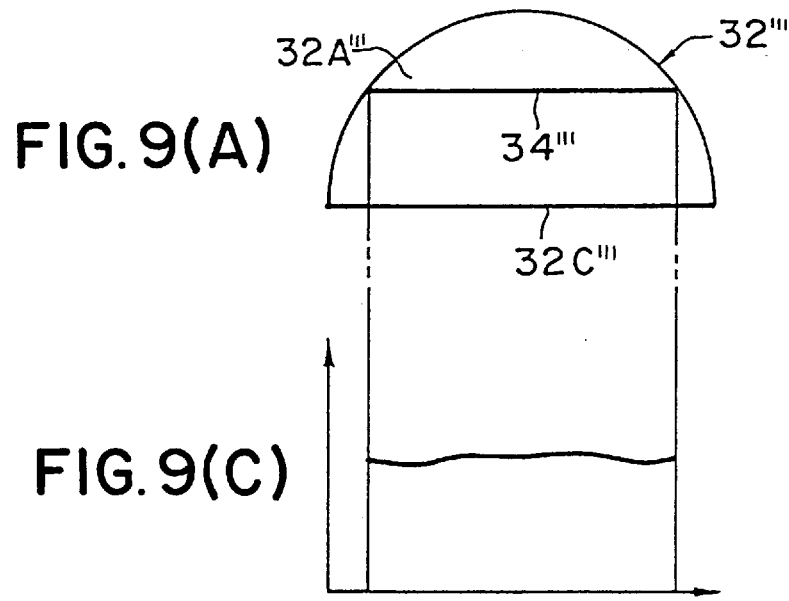
FIG. 9(A)
FIG. 9(C)

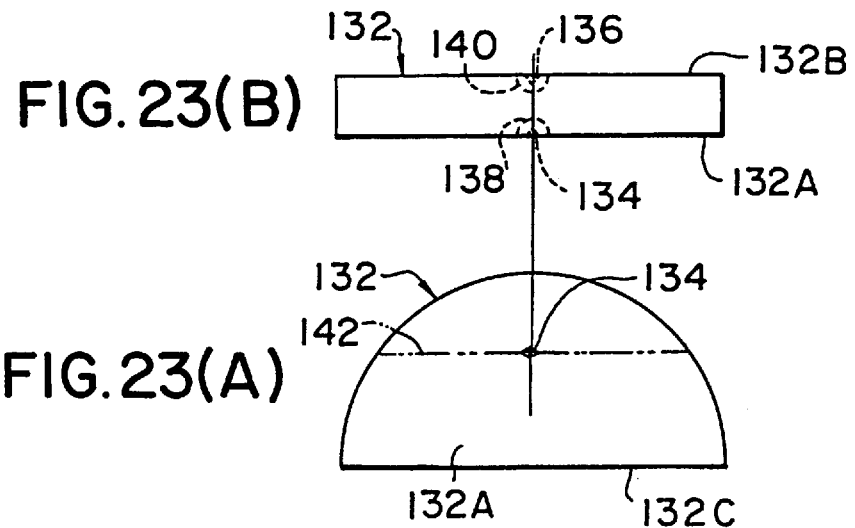
FIG. 24
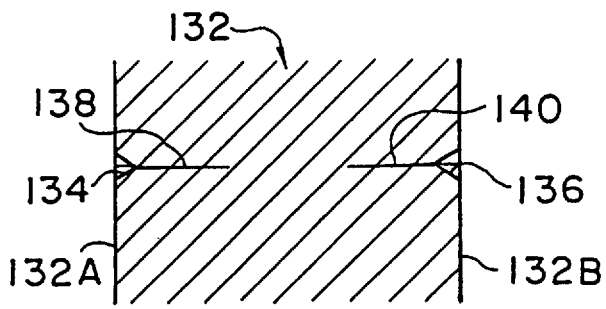
FIG. 25
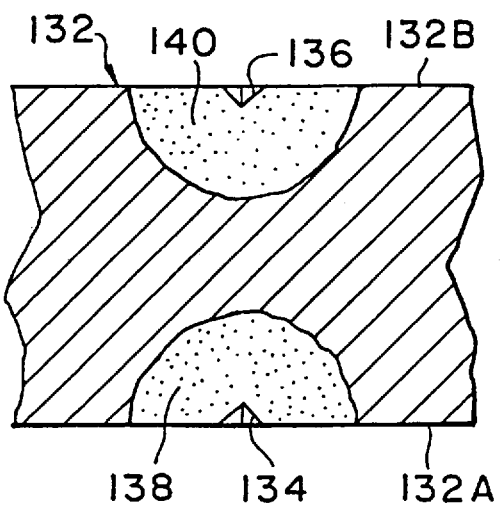

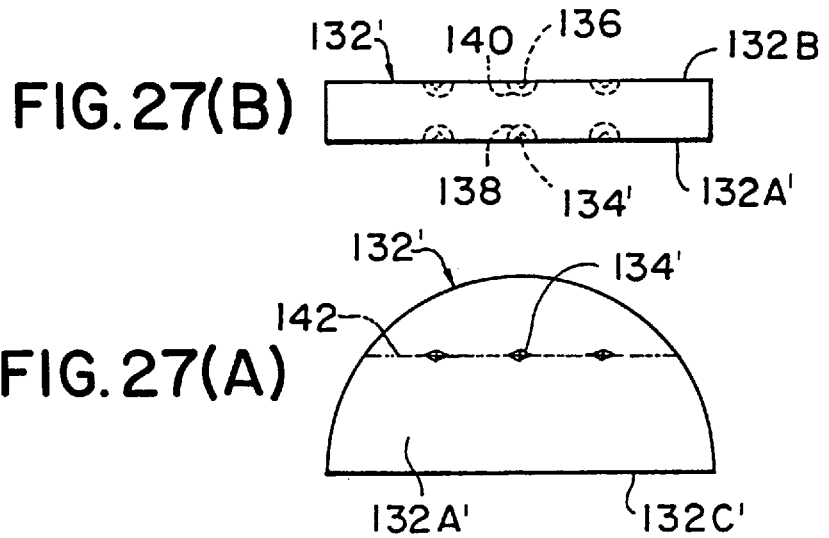
FIG. 28
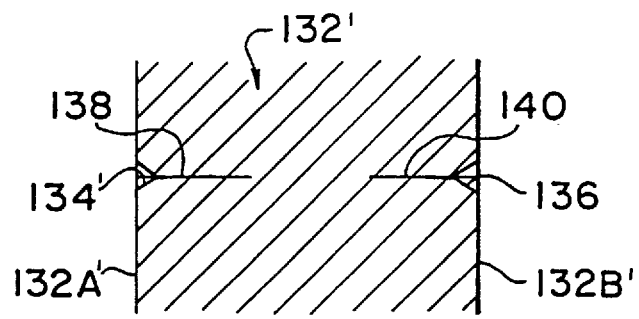
FIG. 29
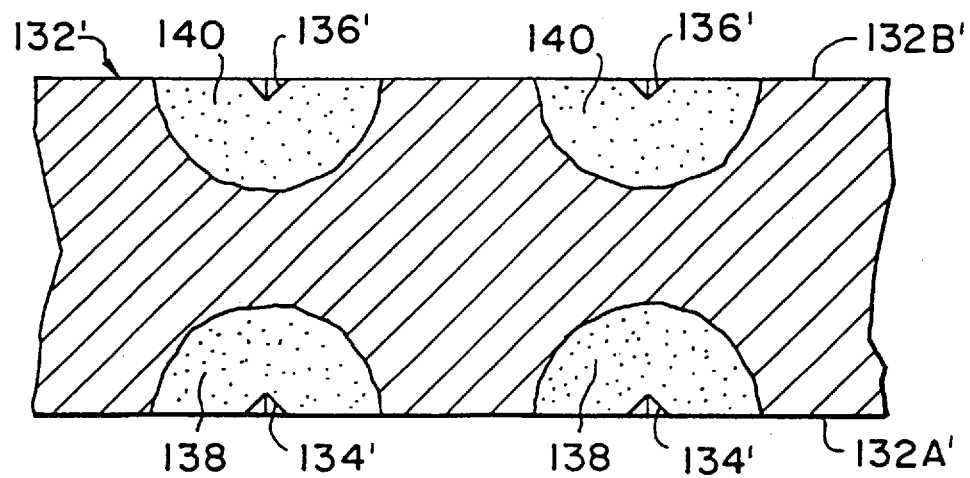

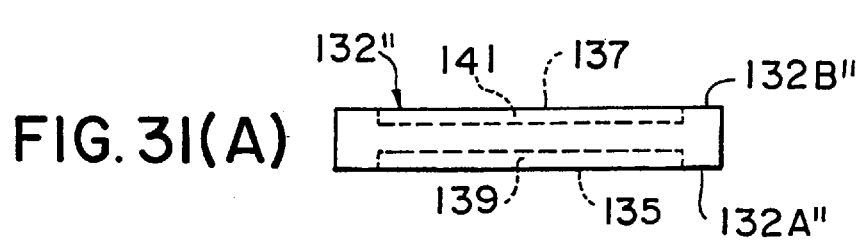
FIG. 31(A)
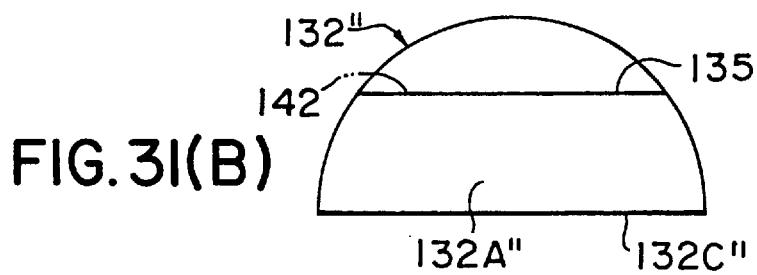
FIG. 31(B)
FIG. 32
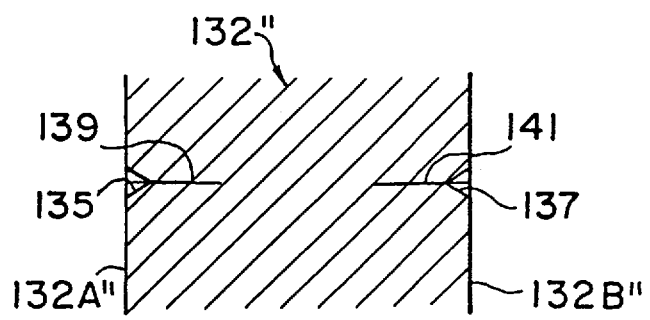
FIG. 33
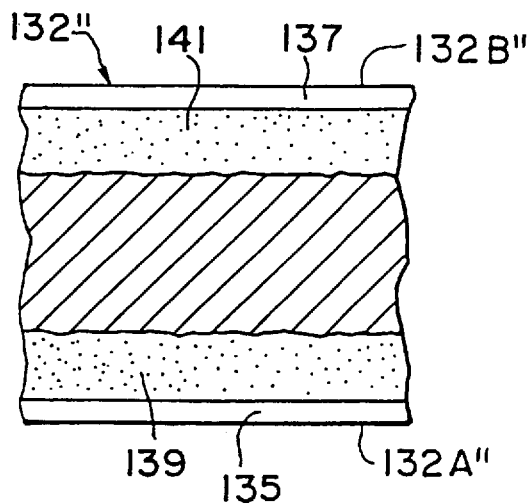

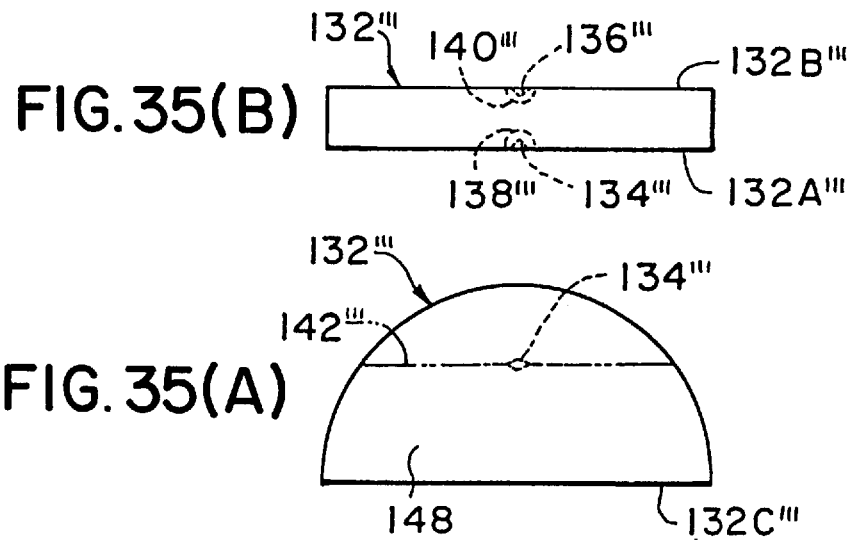
FIG. 35(B)
FIG. 35(A)
FIG. 36
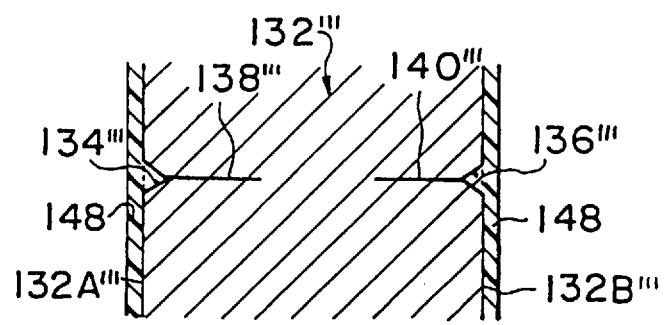
FIG. 37
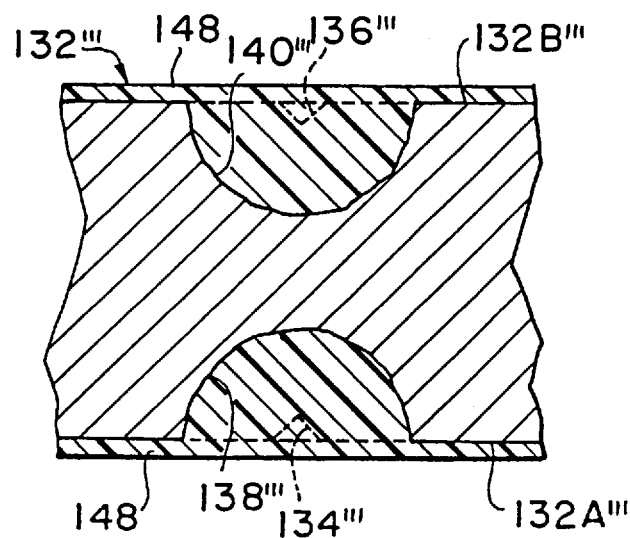

POWER STEERING SYSTEM HAVING A MECHANICAL SAFETY BREAKER

This is a continuation of application Ser. No. 08/319,589, filed Oct. 7, 1994, now abandoned.

BACKGROUND OF THE INVENTION

1. Field of the Invention

The present invention relates to a mechanical safety breaker to be incorporated in a mechanical connection to sever the connection when a force or torque transmitted therethrough increases beyond a predetermined value.

2. Prior Art

The mechanical safety breaker adapted to operate normally to transmit a force or torque therethrough but to get broken when the magnitude of the force or torque increases beyond a predetermined limit value so as thereby to cease the transmission of the force of torque for the safety purpose is known and used in various mechanical devices. Conventionally, a breaker element which forms an essential part of a force or torque transmitting construction of such a mechanical safety breaker and is fractured by an overloading is generally made of metal or resin generally known as having high impact resistance. However, there is a problem in making the breaker element by metal or resin, because the fracture strength of metal or resin generally lowers much due to fatigue when it has been subjected to repetitive loadings. Therefore, when the breaker element of the mechanical safety breaker is made of metal or resin, there occurs a great inconvenience that the breaker is undesirably actuated after a period of use even when the mechanical load to be transmitted is still below a limit value predetermined for its actuation.

In Japanese Patent Laid-open Publication 61-220968 it is shown to incorporate a mechanical safety breaker in an electric motor type power steering system of a vehicle such as an automobile such that an electric motor is drivingly connected with the steering shaft via a breaker element (sheer pin) adapted to be broken when the sheering force applied thereto increases beyond a predetermined value, considering that, in the electric motor type power steering system which generally includes an electronic control system and controls supply of electric power to the electric motor to be generally increased in accordance with increase of the manual force for operating the steering wheel, the electronic control system is not so free from any troubles as the simply mechanical steering shaft system, and further, since a reduction gear train is generally incorporated between the electric motor and the steering shaft driven thereby, if the supply of the electric power to the motor fails or improperly lowers, a high resistance is applied to the manual operation of the steering shaft. However, such a breaker element is subjected to highly frequently repetitive applications of alternating load due to the steering operation of the vehicle, rendering the fracture strength thereof to quickly fall due to fatigue. Nevertheless, it is highly required that the limit value of the steering torque at which the mechanical safety breaker of the power steering system is actuated is stably maintained within a relatively narrow range for a long time such that the mechanical safety breaker should not respond to such a temporal increase of the steering torque as will be caused by a bumping on of a steering vehicle wheel on a curbstone or the like, while ensuring that the steering shaft is released from the electric motor for free manual operation of the steering any time when a trouble has occurred in the assisting power steering system.

SUMMARY OF THE INVENTION

In view of the above-mentioned problems and requirements, it is a primary object of the present invention to provide an improved mechanical safety breaker which keeps a highly stabilized actuation point over a long period of operation without being affected by repetitive applications of load and aging of the material.

According to the present invention, the above-mentioned primary object is accomplished by a power steering system for assisting steering operation of a manual steering system having a rack and pinion steering means, a steering shaft connected with the rack-and-pinion means for steering operation thereof, and a steering wheel connected with the steering shaft for driving the steering shaft in either of opposite steering directions by a driver. The power steering system comprises a motor and means for torque transmittingly connecting the motor with the manual steering system. The torque transmitting connection means includes a mechanical safety breaker element for breaking the torque transmitting connection of the motor with the manual steering system when the torque transmitted exceeds a predetermined limit value. The breaker element is made substantially of a ceramic material.

FIG. 49 shows the performance of fracture strength of a ceramic (silicon nitride) and a metal (alloyed steel, JIS SCM 415) in comparison. As will be appreciated from this figure, the fracture strength of the ceramic is much stabilized against fatigue than that of the metal. For example, the fracture strength of the ceramic remains at about 80% of its initial value even after $10^8$ times repetitive loadings. In this figure, the fracture strength is shown in the stress by megapascal. The aging performance of the fracture strength of the ceramic is also stabilized. as will be appreciated in this figure.

Therefore, by making the breaker element of the mechanical safety breaker by a ceramic material, the fracture performance of the breaker element can be highly stabilized for a long time of use under repetitive applications of load.

Thus, based upon the long term stabilized performance accomplished by the basic concept of the present invention, it is a further object of the present invention to provide an improved mechanical safety breaker which has a high precision with respect to the setting of the actuation point thereof.

In order to accomplish the further object said breaker element may be a plate element adapted to transmit said force via a sheering along a cross sectional region at a middle portion thereof in a plane extension thereof.

In this case, said cross sectional region of said plate element may be defined by a pair of notches formed in opposite surfaces of said plate element to be substantially aligned to one another across the thickness thereof.

Further, said plate element may have a sectoral configuration with said notches being formed in parallel with a straight edge thereof to traverse a middle portion of said sectoral configuration, the depth of said notches being changed along a length thereof so as to be smallest at a central portion of the length and to be largest at opposite ends of the length. In such a construction, the depth of said notches may be changed arcuately so as to define arcuately convex opposite edges of said cross sectional region. Or the depth of said notches may be changed straightly so as to define straightly convex opposite edges of said cross sectional region.

Further, said plate element may have a sectoral configuration with said notches being formed in parallel with a straight edge thereof to traverse a middle portion of said sectoral configuration, the depth of said notches being substantially constant along a length thereof.

When the mechanical safety breaker is constructed in such a construction that said first mechanical member has a cylindrical outside surface and a substantially radial first key groove opening to said cylindrical outside surface thereof, while said second mechanical member has a cylindrical inside surface to slidably engage with said cylindrical outside surface of said first mechanical member and a substantially radial second key groove opening to said cylindrical inside surface thereof and adapted to align with said first key groove, said plate element being mounted half by half in said first and second key grooves at opposite half portions thereof so as to be subjected to a sheering in the direction of thickness thereof along said cross sectional region by a relative rotational movement of said first and second mechanical members, said pair of notches are arranged such that central planes of said pair of notches join tangentially to a phantom cylindrical curve centred at a central axis of said cylindrical outside surface of said first mechanical member at bottoms of said notches so as thereby to induce a sheering fracture of said plate element along the phantom cylindrical curve.

According to another embodiment, said cross sectional region of said plate element may be defined by at least a pair of Knoop indents accompanied by corresponding sectoral cracks formed in opposite surfaces of said plate element to be substantially aligned to one another across the thickness thereof.

In this case, said cross sectional region of said plate element may be defined by at least three pairs of Knoop indents accompanied by corresponding sectoral cracks formed in opposite surfaces of said plate element, each said pair of Knoop indents and the corresponding sectoral cracks being substantially aligned to one another across the thickness thereof, while said at least three pairs of Knoop indents and the corresponding sectoral cracks being consistent to define said cross sectional region.

Alternatively, said cross sectional region of said plate element may be defined by a pair of linear scratches formed by a Knoop head to be accompanied by corresponding linear cracks formed in opposite surfaces of said plate element to be substantially aligned to one another across the thickness thereof.

According to a further embodiment, said plate element may be an assembly of at least first, second and third plate members, at least said first plate member being made of a ceramic, said second and third plate members being bonded to a surface of said first plate member so as to define a slit therebetween to induce a fracture of said first plate member along a portion thereof aligned with said slit.

Further, said ceramic breaker element may be coated with a layer of a resin.

The mechanical safety breaker according to the present invention may be constructed such that said first mechanical member has a cylindrical outside surface and a substantially radial first key groove opening to said cylindrical outside surface thereof, while said second mechanical member has a cylindrical inside surface to slidably engage with said cylindrical outside surface of said first mechanical member and a substantially radial second key groove opening to said cylindrical inside surface thereof and adapted to align with said first key groove, said breaker element being a key mounted half by half in said first and second key grooves at opposite half portions thereof so as to transmit a torque between said first and second mechanical members around an axis corresponding to a central axis of said cylindrical outside surface of said first mechanical member.

In the above-mentioned construction, said first and second key grooves may each be formed to define an edge at an opening end thereof which functions as a sheering edge against said key across a middle cross sectional region thereof.

Alternatively, at least one of said first and second key grooves may be formed with a port space for widening an opening end thereof so as to provide a space in which said key is substantially subjected to a bending stress by a torque transmitted therethrough.

Further, the mechanical safety breaker according to the present invention may be constructed such that said first mechanical member has an annular surface adapted to turn about a rotation axis and a first key groove opening to said annular surface thereof, while said second mechanical member has an annular surface opposing said annular surface of said first mechanical member with a substantial space left therebetween and a second key groove opening to said annular surface thereof and adapted to align with said first key groove, said breaker element being a key mounted half by half in said first and second key grooves at opposite half portions thereof with a middle portion thereof traversing said space so as to transmit a torque between said first and second mechanical members around said axis of rotation.

Said first and second key grooves and said key received therein may be provided in duplicate around said central axis such that when a first set of said key grooves and key operates to substantially transmit a torque between said first and second mechanical members, a second set of said key grooves and key idles, and when said key of said first set of said key grooves and key has been fractured, said second set of said key grooves and key operates to substantially transmit a torque between said first and second mechanical members.

Alternatively, a single key may be constructed to have a stepped thickness so as to present a relatively thicker half portion and a relatively thinner half portion such that when said thicker half portion operates to substantially transmit a torque between said first and second mechanical members, said thinner half portion idles, and when said thicker half portion has been fractured, said thinner half portion operates to substantially transmit a torque between said first and second mechanical members.

Further, the mechanical safety breaker according to the present invention may be constructed such that said first and second mechanical members are each a rotary member adapted to rotate about a common axis of rotation as axially spaced from one another along said axis of rotation, and said breaker element is a member to connect axially opposing end portions of said first and second mechanical members with one another so as to transmit a torque therebetween by bearing a twisting load applied thereto.

BRIEF DESCRIPTION OF THE DRAWING

In the accompanying drawing,

FIG. 8(A) is a plan view and FIG. 8(B) is a front view; of the key and FIG. 8(C) is a graph of the stress factor, illustrating a variation with respect to the depth of the notches;

FIGS. 9(A)–9(C) are views similar to FIGS. 8(A)–8(C), illustrating another variation with respect to the depth of notches;

FIG. 23(A) and FIG. 23(B) show a ceramic key according to still another embodiment in a plan view and a front view respectively, the key being formed with a pair of Knoop indents with accompanying sectoral cracks;

FIG. 24 is a cross section of a part of the key shown in FIG. 23(B), traversing the Knoop indents and the cracks;

FIG. 25 is a longitudinal section of a part of the key shown in FIG. 23(B), traversing the Knoop indents and the cracks;

FIG. 27(A) and FIG. 27(B) show in the same manner as FIGS. 23(A) and FIG. 23(A) and FIG. 23(B) a ceramic key according to still another embodiment in a plan view and a front view respectively, the key being formed with three pairs of Knoop indents with accompanying sectoral cracks;

FIG. 28 is a cross section of a part of the key shown in FIG. 27(B), traversing one of the Knoop indents and the cracks;

FIG. 29 is a longitudinal section of a part of the key shown in FIG. 27(B), traversing the Knoop indents and the cracks;

FIG. 31(A) and FIG. 31(B) shows in the same manner as FIGS. 23(A)–23(B) a ceramic key according to still another embodiment in a plan view and a front view respectively, the key being formed with a linear scratch by a Knoop head with an accompanying linear crack;

FIG. 32 is a cross section of a part of the key shown in FIG. 31(B), traversing the linear scratch and the accompanying linear crack;

FIG. 33 is a longitudinal section of a part of the key shown in FIG. 31(B), traversing the linear scratch and the linear crack;

FIG. 35(A) and FIG. 35(B) show in the same manner as FIG. 23(A) and FIG. 23(B) a ceramic key in a plan view and a front view respectively, the key to be encased in a resin coating as shown in the following FIGS. 36 and 37;

FIG. 36 is a cross section of a part of the key shown in FIG. 35(B) in the condition with a resin coating formed therearound, traversing the Knoop indents and the accompanying linear cracks;

FIG. 37 is a longitudinal section of the part of the key shown in FIG. 36, taken along the Knoop indents and the sectoral cracks;

DESCRIPTION OF THE PREFERRED EMBODIMENTS

Figure 1:
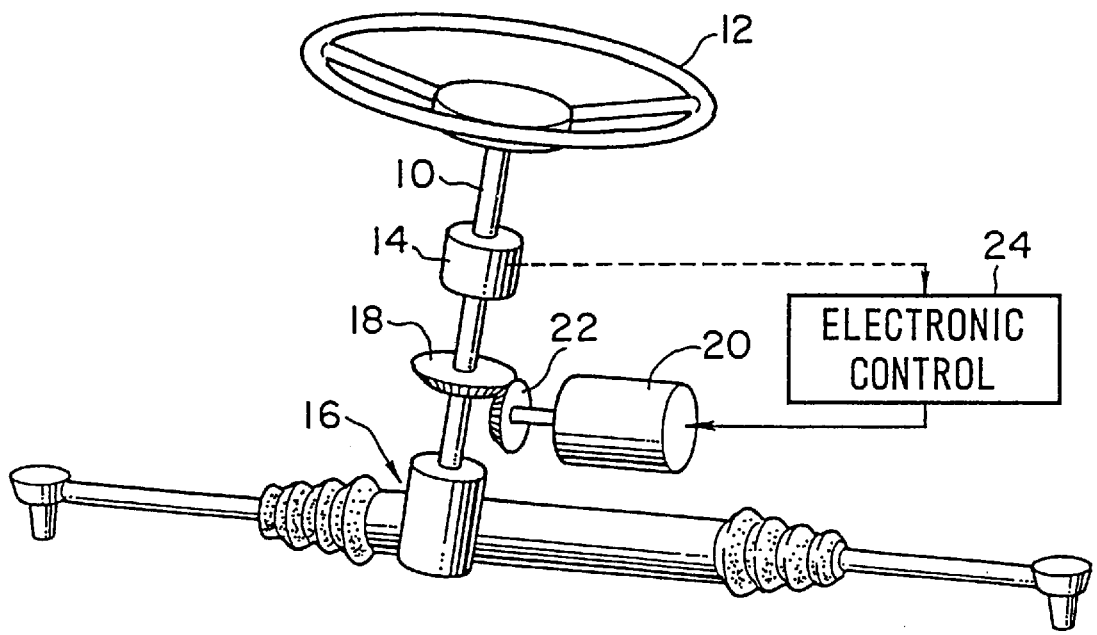
FIG. 1 is a perspective view according to somewhat schematic fashion of a steering system of an automobile incorporating an electric motor type power steering means.

In the following the present invention will be described in more detail in respect of the preferred embodiments thereof with reference to the accompanying drawings. All through the figures, corresponding portions are designated by corresponding reference numerals with or without particular descriptions thereabout for the convenience of review.

Referring to FIG. 1, a power steering system herein shown in a somewhat schematic fashion comprises a steering shaft 10, a steering wheel 12 and a rack-and-pinion steering means 16 arranged according to a well known conventional construction, and further comprises a torque sensor 14 for detecting a torque applied to the steering shaft 10 through the steering wheel 12, a bevel type driven gear 18 mounted on the steering shaft 10 through the means described in detail hereinbelow, an electric motor 20, a bevel type drive gear 22 mounted on an output shaft of the motor 20 and meshing with the driven gear 18, and an electronic control means 24 adapted to supply a controlled electric power to the motor 20 according to input signals including a signal indicating a manual steering torque detected by the torque sensor 14. The electronic control means 24 is generally so constructed as to operate the motor 20 in a manner of generating a power generally proportional to the manual steering torque detected by the torque sensor 14.

Figure 2:
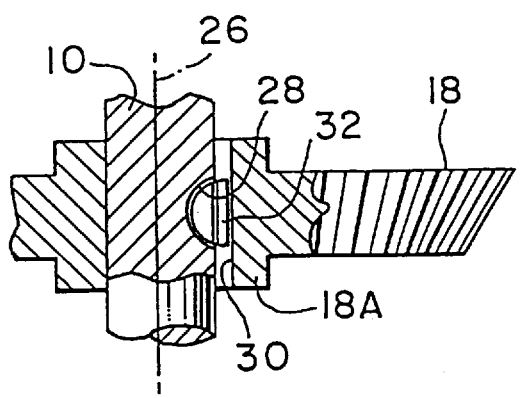
FIG. 2 shows an axial section of an assembly of the steering shaft and the driven gear incorporated in the steering system shown in FIG. 1.
Figure 3:
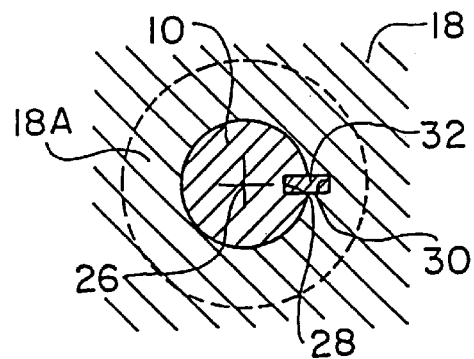
FIG. 3 shows a cross section of the assembly shown in FIG. 2.

The driven gear 18 mounted on the steering shaft 10 is torque transmittingly connected therewith by such a key construction as shown in FIG. 2 in an axial section along a central axis 26 of the steering shaft 10 as well as in FIG. 3 in a cross section perpendicular to the central axis 26. As shown in these figures, the steering shaft 10 is formed with a sectoral key groove 28, while the gear 18 is formed with a linear key groove 30 at a hub portion 18A to align with the sectoral key groove. Then, there is mounted a sectoral key 32 such that a half portion thereof is closely received in the sectoral key groove 28 of the steering shaft 10, while a remaining half portion thereof is closely received in the linear key groove 30 of the gear 18, so as to provide a torque transmitting connection between the steering shaft 10 and the gear 18. This key 32 is made of a ceramic such as silicon nitride.

Figure 4:
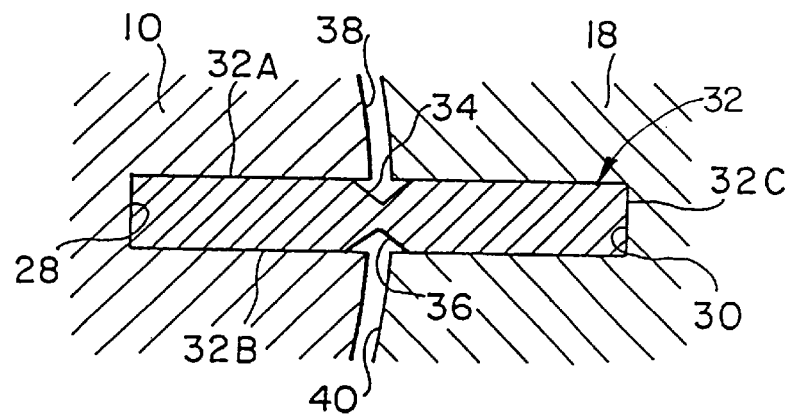
FIG. 4 shows a portion around the key in FIG. 3 in more detail at an enlarged scale.
Figure 5:
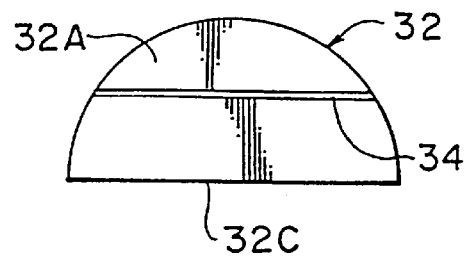
FIG. 5 is a plan view of the key shown in FIGS. 2–4.

Referring to FIGS. 4 and 5, in more detail, the key 32 is formed with a pair of notches 34 and 36 in opposite surface portions 32A and 32B so as to extend in parallel with a linear edge 32C of a sectoral configuration thereof and to be in alignment with a clearance between an outside surface 38 of the steering shaft 10 and an inside surface 40 of the gear 18 defining a bore thereof through which the steering shaft 10 extends. As shown in FIG. 4, the width of the notches 34 and 36 at the opening end thereof is substantially wider than the clearance between the surfaces 38 and 40 such that, even when some relative shifting occurs in the leftward or rightward direction as viewed in FIG. 4 among the steering shaft 10, the gear 18 and the key 32 due to shifting of the clearance or thermal expansion, the edges defined by the outer surface 38 and the opposite side surfaces of the sectoral key groove 28 as well as the inside surface 40 and the opposite side surfaces of the linear key groove 30 still remain as exposed in the notches 34 and 36.

The above-mentioned key construction provides a mechanical safety breaker which normally torque transmittingly connects the steering shaft 10 with the gear 18, i.e. the assisting steering power source provided by the motor 20, as long as the key 32 remains integral, but ceases the torque transmitting connection so that the steering shaft 10 can be rotated free of the gear 18, i.e. the motor 20 and its driving gear train (generally reduction gear train) schematically illustrated by the bevel gears 18 and 20, when the key 32 has been fractured along the notches 34 and 36.

Figure 49:
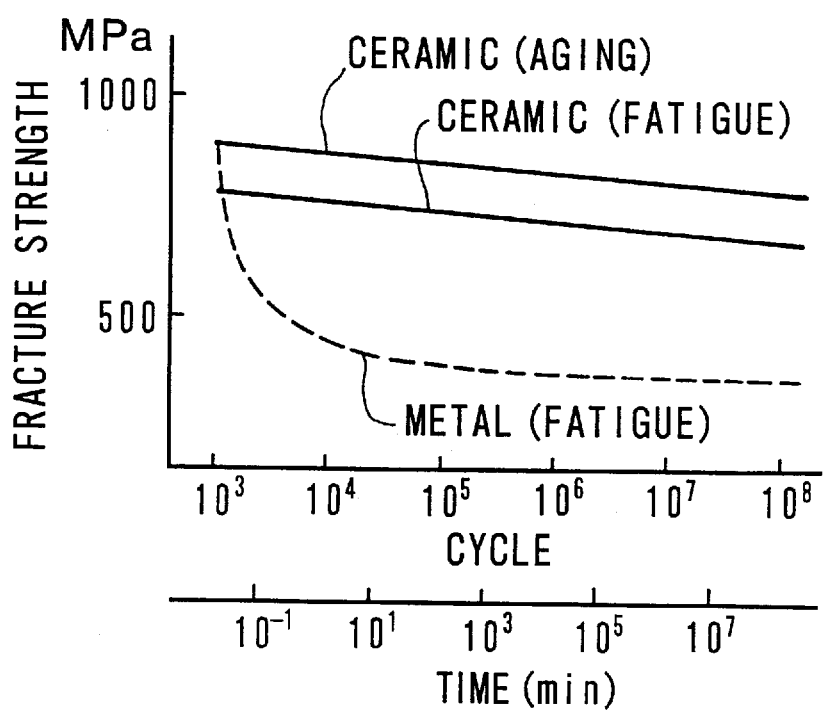
FIG. 49 is a graph showing the fatigue performance of the fracture strength of a ceramic and a metal in comparison in the relation between the stress factor and the frequency of repetitive applications of load, together with the aging performance of the ceramic.

A limit value of the force, or more precisely the sharing force in the above-mentioned constructions, applied to the key 32 according to a torque transmitted therethrough between the steering shaft 10 and the gear 18 which causes the fracture of the key 32 along the cross sectional region defined between the notches 34 and 36 will stably remain with a very small reduction such as 20% for a large number of repetitive applications of load such as $10^8$ times as will be appreciated in view of FIG. 49.

Figure 6:
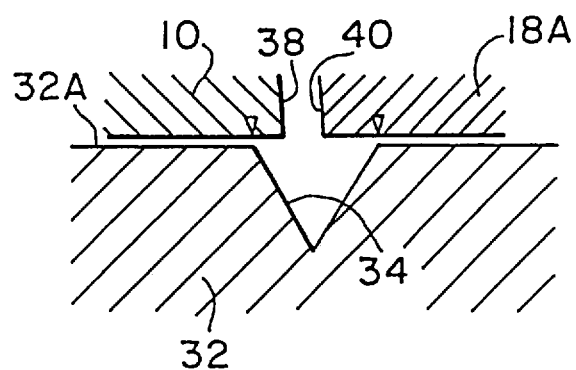
FIG. 6 is a view corresponding to a portion of FIG. 4, illustrating a function thereof.

Further, since in the above-mentioned constructions the sheering edges which causes the fracture of the key 32 is substantially determined by the notches 34 and 36, without being affected by the edges of the steering shaft 10 and the gear 18 bordering the respective key grooves 28 and 30, a high precision is available in the setting of the torque limit at which the mechanical safety breaker is actuated. FIG. 6 shows a portion around the notch 34 in FIG. 4 at a larger scale, wherein the points of contact between the steering shaft 10 and the key 32 and between the gear 18 and the key 32 crucial in determining the fracture of the key 32 are shown by white triangles. By the opening width of the notch 34 being selected to be large enough to accept the opposing edges of the steering shaft 10 and the gear 18 therein in spite of any probable relative shifting therebetween according to a clearance between the key and the corresponding key groove, thermal expansion, etc., the above-mentioned crucial contact points always remain along the opposite edge portions of the notch regardless of such relative shiftings, more stabilizing the fracture performance of the key 32.

Figure 7:
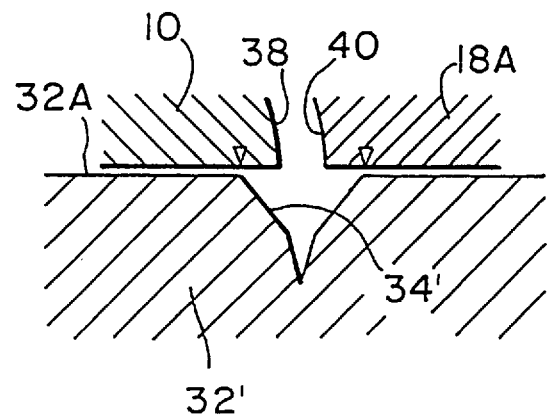
FIG. 7 is a view similar to FIG. 6, showing a modification of the cross sectional configuration of the notch.

The cross sectional shape of the notch 34' (and also notch 36') may be modified as shown in FIG. 7 to increase the sharpness of the notch at the bottom portion of notch 34' of key 32' thereof relative to the wideness of the key groove at its open end so that a relatively large distance is available between the opposite points of contact.

The depth of the notch 34" and/or the notch 36" defined by the bottoms 34B" and 36B" may be constant along the length thereof as shown in FIG. 8(B). In this case, although the larger half portion of the key 32" bordered by the notches 34" and 36" has a substantially rectangular plan configuration to contact with the gear 18, the smaller half portion of the key 32" bordered by the notches 34" and 36" has a genuine sectoral plan configuration to contact with the gear 18, with an extension thereof perpendicular to the notches 34" and 36" gradually decreasing from a central maximum extension toward zero at opposite side ends, as shown by hatching in FIG. 8(A), and therefore, a stress factor (defined as the rate of stress generated in the breaker element to the load applied thereto) which provides the magnitude of the sheering stress generated at each portion of the cross sectional region of the key 32" left between the opposing notches 34" and 36" along the length thereof according to a torque load applied between the steering shaft 10 and the gear 18 changes as shown in FIG. 8(C), along the length of said cross sectional region. In this case, therefore, when the torque load applied between the steering shaft 10 and the gear 18 exceeds a limit value, the fracture of the key 32" will start at a lengthwise central portion of the sectional region left between the notches 34" and 36". This will provide an advantage that the limit torque to start the fracture of the key 32" is sharply determined to be the value of the torque corresponding to the crest of the convex curve shown in FIG. 8(C).

FIG. 9(A)–FIG. 9(C) show a modification with respect to the depth of the notches 34" and 36" in the same manner as in FIGS. 8(A)–8(C). In this embodiment, the depth of the notches 34'" and 36'" is changed according to an arcuate contour such that the notches are shallowest at the lengthwise central portion thereof and gradually get deeper toward opposite side ends thereof. By the curvature of the depth contour being appropriately determined, the stress factor can be adjusted to be substantially constant along the length of the cross sectional region defined between the notches 34'" and 36'" as shown in FIG. 9(C). This embodiment will provide an advantage that the fracture of the key 32'" is sharpened with respect to the lapse of time, or in other words, when the fracture of the key 32'" occurs, the fracture is completed in a short time after the start.

Figure 10B:
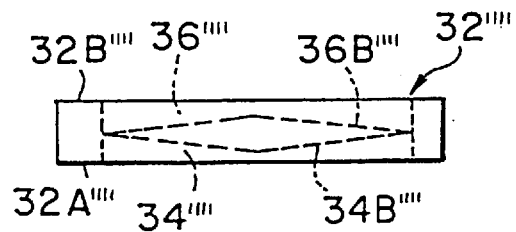
FIGS. 10(A)–10(C) are views similar to FIGS. 8(A)–8(C) or FIGS. 9(A)–9(C), illustrating still another variation with respect to the depth of the notches.
Figure 10A:
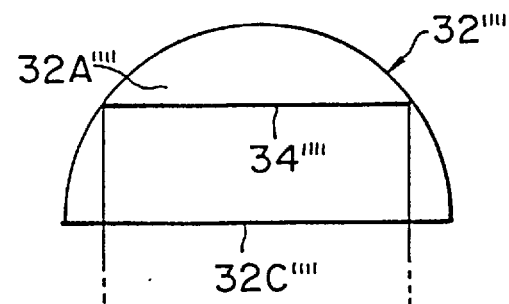
Figure 10C:
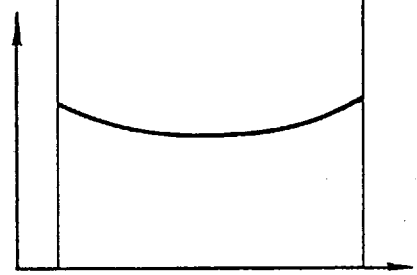

FIGS. 10(A)–10(C) show still another modification with respect to the depth of the notches 34' and 36' in the same manner of illustration as in FIGS. 8(A)–8(C) and 9(A)–9(C). In this embodiment, the depth of the notches 34"" and 36"" is changed linearly such that it is shallowest at the lengthwise central portion thereof and increases linearly gradually toward opposite side ends thereof. In this case, the stress factor shows a concave performance as shown in FIG. 10(C). Therefore, when the torque load applied between the steering shaft 10 and the gear 19 has reached a limit value, the fracture of the key 32"" will start at the lengthwise opposite ends thereof so as to gradually proceed toward the lengthwise central portion thereof. This embodiment will provide an advantage that the fracture performance is sharpened with respect to the magnitude of the torque load so that the fracture of the key starts at the lengthwise opposite. ends of the sectional region left between the notches 34"" and 36"" at which the stress factor becomes highest and the fracture performance is also sharpened with respect to the lapse of the time as the fracture proceeds from the opposite ends toward the central portion in parallel.

Figure 11:
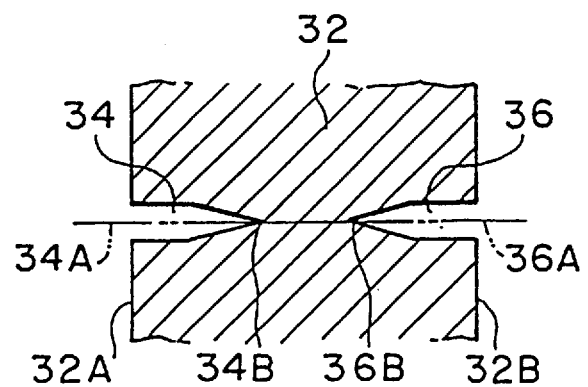
FIG. 11 is a sectional view illustrating a basic arrangement of a pair of notches.

With respect to the cross sectional configuration of the notches 34 and 36, it is desirable that they are symmetrically aligned with one another as diagrammatically shown in FIG. 11 (which applies to all embodiments but for convenience depicts the first embodiment) so that the highest concentration of the sheering stress occurs along a phantom plane extended between the bottoms 34B and 36B of the notches 34 and 36 which coincides with a common. central plane 34A and 36A of the notches 34 and 36, thereby sharply defining the section of fracture.

Figure 12:
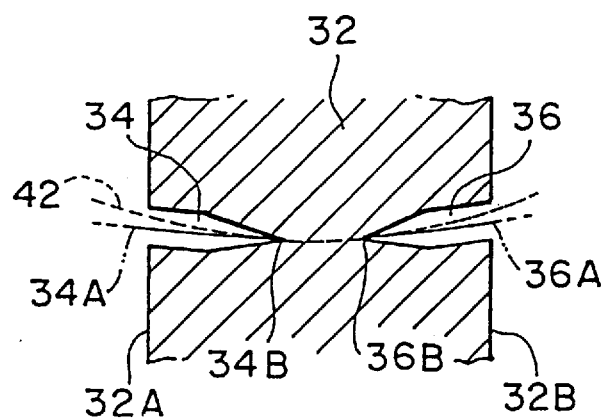
FIG. 12 is a view similar to FIG. 11, illustrating a modification of the arrangement of FIG. 11.

However, as an alternative, the notches 34 and 36 may be arranged as diagrammatically shown in FIG. 12 such that the central planes 34A and 36A of the notches 34 and 36 join tangentially to. a phantom cylindrical curve 42 centred at the central axis 26 of the steering shaft 10 at the bottoms 34B and 36B of the notches 34 and 36 so as thereby to induce a sheering fracture of the key 32 along the phantom cylindrical curve 42, and thereby to obtain an advantage that the sheer fractured surfaces of the opposite halves of the key 32 generated by the fracture thereof present a contour which follows more faithfully the cylindrical configuration of the annular space between the steering shaft 10 and the gear 18, thus presenting less obstacle to the free rotation of the steering shaft 10 relative to the gear 18 after the fracture of the key 32.

Figure 13:
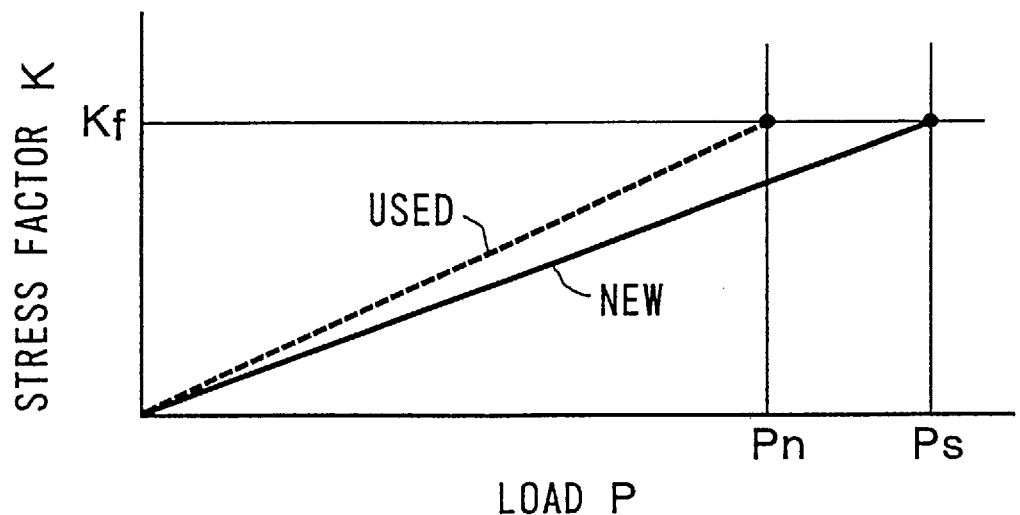
FIG. 13 is a graph showing a fatigue performance of the ceramic key in a relation between the stress factor and the load.

Although the fracture performance of the mechanical safety breaker according to the present invention against repetitive applications of load to be transmitted and the aging is substantially stabilized by employing a ceramic breaker element such as the keys 32 in the embodiments described above, the ceramic key is of course not completely free from the change of fracture performance due to repetitive application of load and the aging, as will be apparent from the right-downwardly inclined performance curves shown in FIG. 49. A lowering of the fracture strength of the ceramic breaker element according to the repetitive applications of load and the aging corresponds to an increase of the ratio of the stress factor to the load transmitted by the mechanical safety breaker as shown in FIG. 13, in which the performance curve shown by a solid line represents the relation between the stress factor K and the load P transmitted by the mechanical safety breaker at the new starting condition of a ceramic breaker element, such an initial performance curve being shifted toward the performance curve shown by a broken line reached after a period of operation, such that the breaker which will be activated at a load value Ps which provides a fracture stress factor Kf will be actuated at a lower load Pn when it has been used for a certain period.

Figure 14:
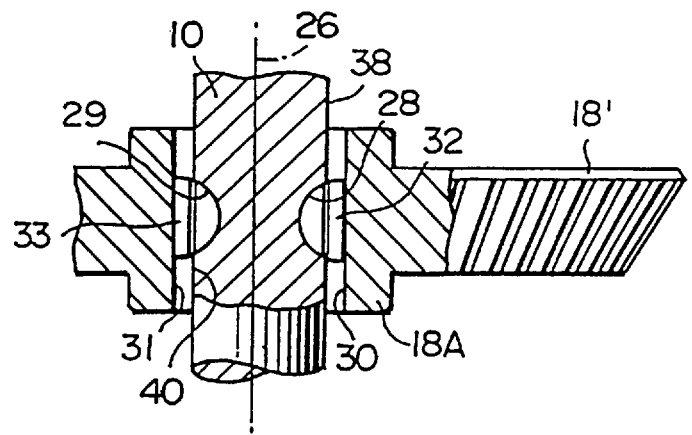
FIG. 14 is a view similar to FIG. 2, showing a double key construction embodiment.
Figure 15:
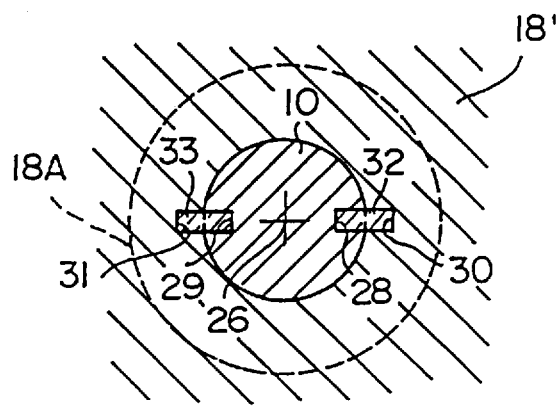
FIG. 15 shows a cross section of the construction shown in FIG. 14.

FIGS. 14 and 15 are views similar to FIGS. 2 and 3, respectively, showing still another embodiment of the mechanical safety breaker according to the present invention. In this embodiment, however, a one more set of key grooves and key is provided in addition to the former set of the key grooves 28 and 30 and the key 32. However, it is to be noted that the key 32 of FIGS. 14 and 15 also represents the keys 32', 32", 32'" and 33"" of the similar embodiments. In the shown embodiment, the new set of a sectoral key groove 29 formed in the steering shaft 10 and having a similar sectoral configuration as the key groove 28, a linear key groove 31 formed in the gear 18' and a ceramic key 33 having a similar sectoral configuration as the key 32 and half by half received in the key grooves 29 and 31, is provided as just diametrically opposed to the set of key grooves 28 and 30 and the key 32 with respect to the central axis 26 of the steering shaft 10. However, it is not essential that these two sets of key grooves and key are positioned as diametrically opposed to one another.

Figure 16:
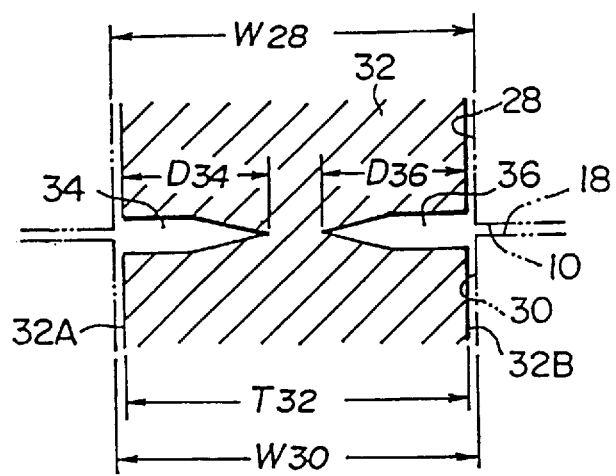
FIG. 16 is a sectional view illustrating an arrangement of a pair of notches for one of the keys in the construction shown in FIG. 14.

FIG. 16 is a sectional view similar to FIG. 11 or 12 showing diagrammatically the cross sectional configuration of the key 32 in the embodiment shown in FIGS. 14 and 15 with the cooperating key grooves 28 and 30 shown in phantom lines. Similarly, FIG. 17 shows diagrammatically the cross section of the key 33 and the cooperating key grooves 29 and 31 in the same manner as in FIG. 16, wherein 33A and 33B designate the opposite side surfaces of the key 33 in the same manner as 32A and 32B with respect to the key 32, and 35 and 37 designate notches formed in opposite side surfaces of the key 33 in the same manner as the notches 34 and 36 with respect to the key 33.

Figure 17:
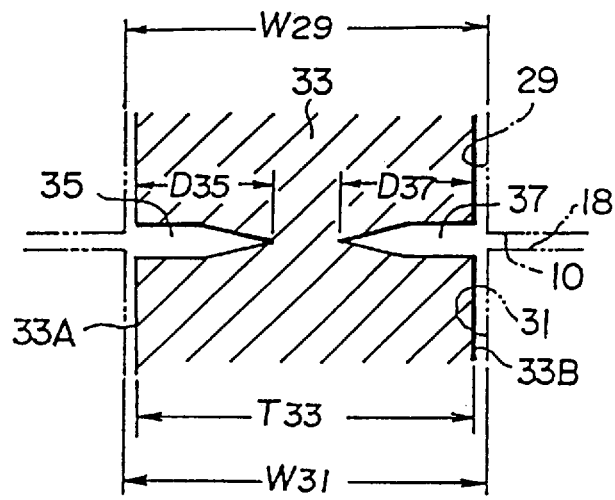
FIG. 17 is a sectional view illustrating an arrangement of a pair of notches for the other of the keys in the construction shown in FIG. 14.

In the above constructions of the two sets of key grooves and key, denoting the width of the respective key grooves, the thickness of the respective keys and the depth of the respective notches as shown in FIGS. 16 and 17, the condition to let the key 32 first operate while letting the key 33 idle in the meanwhile, and when the key 32 has been fractured, to let the key 33 newly operate to provide the same fracture performance as the key 32, will most simply be as follows, provided that, when the center of the key 32 is aligned with the center of the key grooves 28 and 30, the center of the key 33 is aligned with the center of the key grooves 29 and 31:

W28=W28<W30=W31
T32=T32
D34=D36=D35=D37

Thus, when the torque transmittance between the steering shaft 10 and the gear 18 is intermittently repeated in either rotational direction with an increasing lapse of time, it is only the key 32 which is subjected to a lowering of the fracture strength due to fatigue, while the idling key 33 remains almost new.

Referring again to FIG. 13, according to the progress of operation the performance curve of the key 32 gradually shifts from that shown by the solid line to turn upward toward that shown by the broken line, and after a substantial lapse of operation, when the performance curve of the key 32 was shifted to the curve shown by the broken line, if the load applied to the key 32 increases beyond the limit value Pn, there occurs the fracture of the key 32. When the key 32 has been fractured, the key 33 is now put into its operation to provide a new mechanical safety breaker operative according to the new performance curve shown by the solid line, provided that the key 33 is of the same material and the same dimensions of configuration as the key 32. Therefore, according to the embodiment shown in FIGS. 14–17, the lifetime of the mechanical safety breaker is doubled.

FIGS. 18–22 show still another embodiment which is, in fact, a modification of the technical concept embodied by the double key construction shown in FIGS. 14–17. In this embodiment, the double keys 32 and 33 in the preceding embodiment are provided by a single stepped key 52 which has a thicker half portion 54 and a thinner half portion 56. These two half portions 54 and 56 may be made as separate ceramic elements and bonded together along a border surface 57 as best shown in FIG. 20, or they may be formed as respective parts of an integral ceramic key element with a bordering step being formed in one surface thereof or two bordering steps being formed in opposite surfaces thereof. The essential point in this respect is that the thinner half portion 56 is adapted to be readily separated from the thicker half portion 54 when the thicker half portion 54 has been fractured as described hereinbelow.

Figure 18:
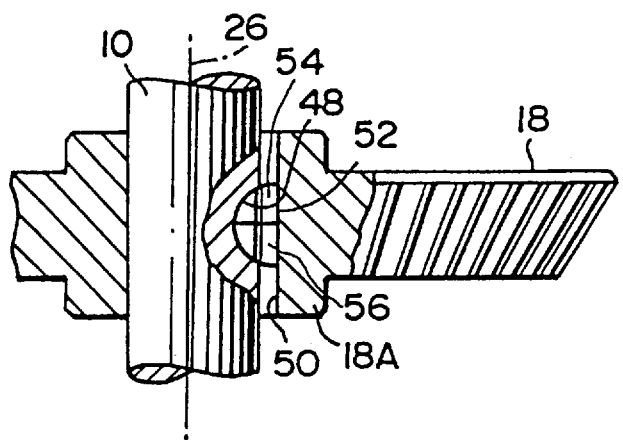
FIG. 18 is a view similar to FIG. 14, showing a stepped key construction.
Figure 19:
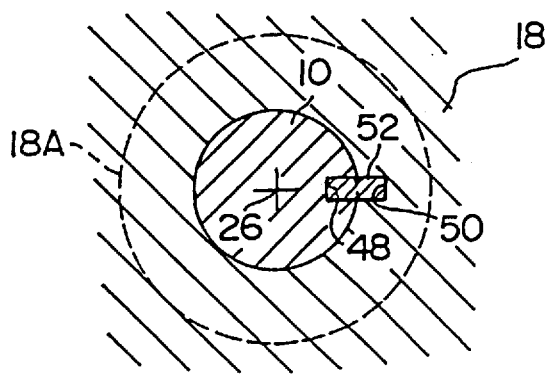
FIG. 19 shows a cross section of the construction shown in FIG. 18.
Figure 20B:
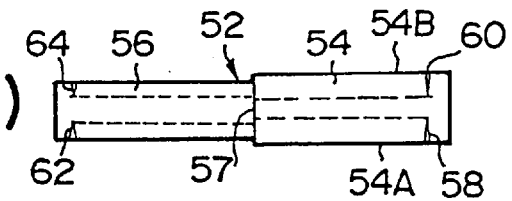
FIG. 20(A) and FIG. 20(B) show the stepped key in the construction shown in FIGS. 18 and 19 in a plan view and a front view respectively.
Figure 20A:
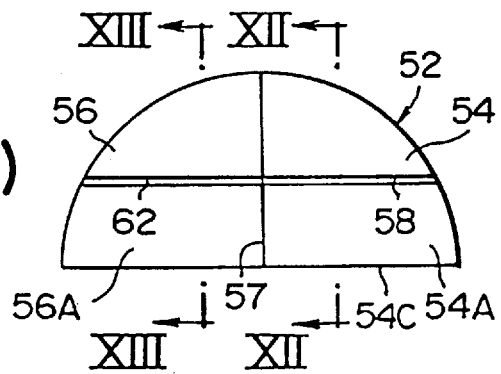

As is clear from FIGS. 18 and 20(A) and 20(B), the ostensibly single ceramic key element 52 having substantially the same sectoral overall configuration as the key elements 32 and 33 in the preceding embodiment is also mounted half by half in the sectoral key groove 48 formed in the steering shaft 10 and a linear key groove 50 formed in the gear 18 such that a pair of notches 58 and 60 formed in opposite surfaces 54A and 54B of the sectoral half portion 54 and a pair of notches 62 and 64 formed in opposite surfaces 56A and 56B of the sectoral half portion 56 are aligned with the clearance between the outer surface of the steering shaft 10 and the inner surface of the annular gear 18 in the same manner as in the former embodiments.

According to the same technical concept as in the preceding embodiment shown in FIGS. 14–17, the thicker half portion 54 of the ceramic key element 52 first operates substantially to transmit a torque between the steering shaft 10 and the gear 18, while in the meantime the thinner half potion 56 idles.

Figure 21:
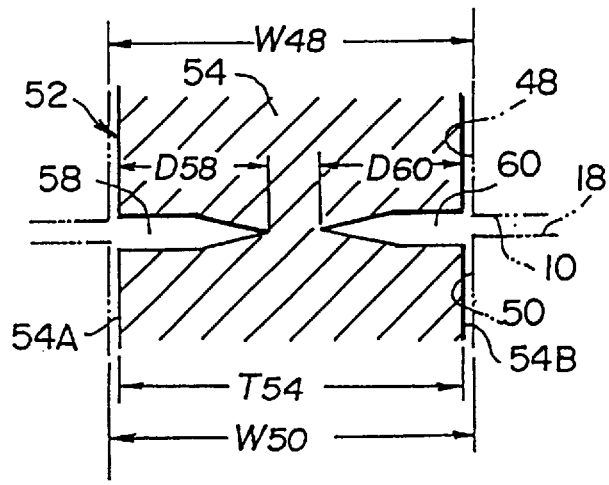
FIG. 21 is a sectional view illustrating an arrangement of a pair of notches for a half of the stepped key in the construction shown in FIG. 20.
Figure 22:
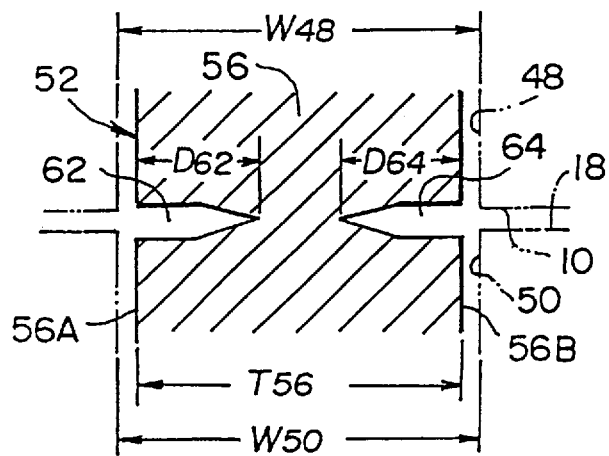
FIG. 22 is a sectional view illustrating an arrangement of a pair of notches for the other half of the stepped key in the construction shown in FIG. 20.

Denoting various dimensions with respect to the key and the key grooves as shown in FIGS. 21 and 22, when the key grooves 48 and 50 are each formed to have a uniform width such as W48 and W50 against the thicker half portion 54 and the thinner half portion 56, since the thickness T56 of the thinner half portion 56 is smaller than the thickness T54 of the thicker half portion 54, if the thinner half portion 56 should show substantially the same fracture performance as the thicker half portion 54 so that, as viewed in FIG. 13, the fracture performance of the key is renewed to substantially the same condition as the new starting of the mechanical safety breaker as shown by the solid performance curve in FIG. 13 after the thicker half portion 54 has been fractured according to the fatigued performance curve as shown by the broken line in FIG. 13, the depth D62 and D64 of the notches 62 and 64 will have to be designed to be smaller than the depth D58 and D60 of the notches 58 and 60, provided that each pair of these notches are formed symmetrically.

It will be appreciated that according to the embodiment shown in FIGS. 18–22, when the ostensibly single ceramic key element 52 is so constructed that, when the fracture has occurred in the thicker half portion 54 along the notches 58 and 60, the thinner half portion 56 is separated from the debris of the thicker half portion 54, the same operation to duplicate the lifetime of the ceramic key element is available as in the preceding embodiment.

In the above-mentioned embodiments, the sectoral ceramic key 32, 33 or 52 was formed with relatively deep notches such as 34 and 36, 35 and 37 or 58, 60, 62 and 64 to define the sheering section of the breaker element along which the fracture of the breaker element should occur. However, considering the matter that the key is applied with a sheering force along a simple phantom plane or a cylindrical curve such as 42 in FIG. 12 extending through a pair of minute parallel clearances defined between the pair of opposing edges defining the opening of a key groove such as 28, 29 or 48 of the steering shaft 10 and the opening of a key groove such as 30, 31 or 50 of the gear 18, it is expected that the key would fracture substantially along said phantom plane or curve if the fracture is once initiated at least at a portion thereof positioned in said phantom plane or curve, without being so definitely delimited by such relatively deep notches as formed in the above-mentioned embodiments. If such expectation is really available, the substantial and difficult work of forming a relatively deep notch such as 34, etc. is substantially obviated by reducing the total thickness of the key to a dimension corresponding to the thickness between the bottom ends of the notches 34 and 36, etc. It is in fact a difficult and time-consuming process to form such a relatively deep notch as 34 and 36, etc. in the above-mentioned embodiments, because the ceramic is a very hard material to be ground away by a grinder blade, and since it gets difficult to keep a high precision about re-positioning of the grinder blade if the grinder blade is exchanged with a new one during forming of one notch, it is generally compelled to use a single grinder blade to form one notch until it is finished. In this case, as the edge of the grinder blade wears along with the progress of grinding operation, here is also bound another difficult problem that the accuracy of the cross sectional contour of the notch is limited by the wearing performance of the grinder blade.

FIGS. 23–25 show an embodiment in which it was tried to provide a sectoral ceramic key 132 having substantially the same outer configuration as the key 32 or 33 in the former embodiments. However, the key 132 in this embodiment has no such notches as 34 and 36 in the former embodiments. Instead, the key 132 is formed with a pair of dot like indents 134 and 136 each accompanied by a sectoral crack 138 or 140 induced at the time of forming the corresponding indent by a Knoop head as explained hereinbelow.

Figure 26A:
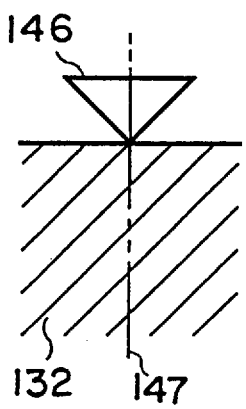
FIGS. 26(A)–26(C) are views illustrating the progress of a process of forming the Knoop indent in a surface portion of the ceramic key with accompanying formation of the sectoral crack.
Figure 26B:
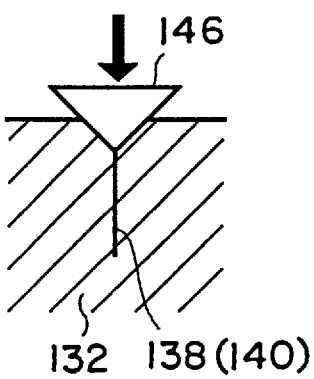
Figure 26C:
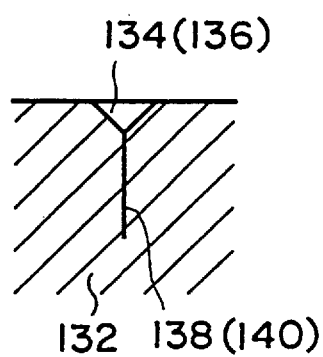

When a punching head 146 is pressed against a ceramic key 132 as shown in FIG. 26, if the punching head 146 is a Vickers head having a tip of a regular square pyramid, two cracks crossing one another along the axis 147 of the punching head are induced by the indent, while if the punching head 146 is a Knoop head having a tip of a diamond pyramid (generally having angles of 130° vs. 172°30'), a single crack 138 is induced to align with the longer axis of the diamond to accompany an indent 134 reflecting the shape of the diamond pyramid of the Knoop head left as permanently deformed.

It was experimented if the sectoral ceramic key 132 formed with the Knoop indent 134 and the sectoral crack 138 as shown in FIGS. 23–25 such that the longer axis of the diamond pyramid is aligned with a straight line corresponding to the notch 34 or 36 in the former embodiments, with formation of a corresponding similar Knoop indent 136 accompanied by a corresponding sectoral crack 140 formed in the opposite surface 132B, is fractured along the line corresponding to the notch 34 or 36 when it is mounted between the steering shaft 10 and the gear 18 in the same manner as shown in the former embodiments with one half being received in the key groove 28 while the other half being received in the key groove 30. As a result, it was confirmed that the fracture is always initiated at either the Knoop indent 134 or 136 according to the direction of the sheering force applied thereto such that the fracture propagates approximately along the line corresponding to the notch 34 or 36. It was also confirmed that the fracture strength can be controlled within a fluctuation of about 3% by the control of the depth of the Knoop indent. Thus, it was confirmed that the key construction shown in FIGS. 23–25 is also an operative embodiment of the mechanical safety breaker according to the present invention.

The same experiment was continued by providing three pairs of Knoop indents 134 and 136 with the accompanying sectoral cracks 138 and 140 along a line 142 along which the fracture of the key should occur, as shown in FIGS. 27–29. As a result, it was confirmed that the fracture of the key occurs more arcuately along the line 142. It was also confirmed that the fracture strength can also be controlled within a fluctuation of about 3% by the control of the depth of the Knoop indents. Therefore, the construction of a key 132' shown in FIGS. 27–29 is also still another operative embodiment of the mechanical safety breaker according to the present invention. Further, it is presumed based upon the constructions shown in FIGS. 23–25 and 27–29 that other numbers of Knoop indents also effectively operative, provided that they are positioned to be in consistent with one another so as to define a desired fracture section.

Figure 30A:
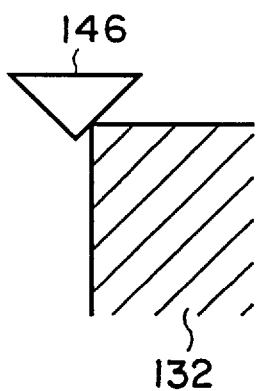
FIGS. 30(A)–30(C) are views illustrating the progress of a process of forming a linear scratch in a surface portion of a ceramic key by a Knoop head with accompanying formation of a linear crack.
Figure 30B:
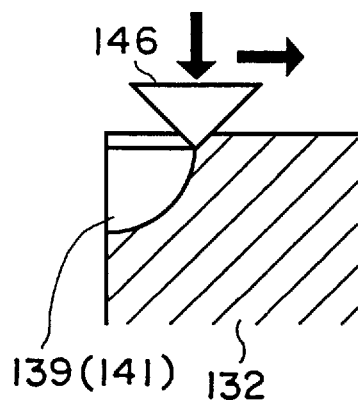
Figure 30C:
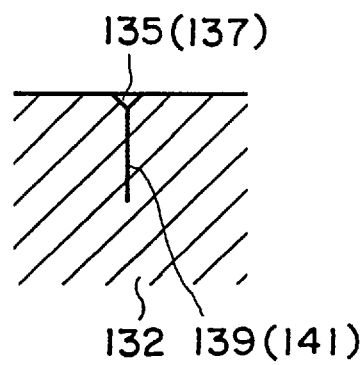

Instead of pressing the Knoop head 146 perpendicularly into the surface of the ceramic key as shown in FIG. 26, the Knoop head 146 was shifted along the surface of the ceramic key as pressed therein at a lesser depth, starting from an edge portion of the surface as shown in FIG. 30, A to proceed as shown in FIG. 30(B) and FIG. 30(C), so that a linear scratch 135 less deep than the above-mentioned Knoop indent 134 is formed with an accompanying linear crack 137. FIGS. 31–33 are views similar to FIGS. 23–25 or 27–29, showing a ceramic key 132" formed with a pair of linear scratches 135 and 137 with the corresponding linear cracks 139 and 141 along the line 142. As a result of the same performance experiments it was confirmed that these linear scratches and cracks are effective to precisely define the fracture section of the ceramic key. Therefore, the construction shown in FIGS. 31–33 is also an effectively embodiment of the mechanical safety breaker according to the present invention.

Figure 34:
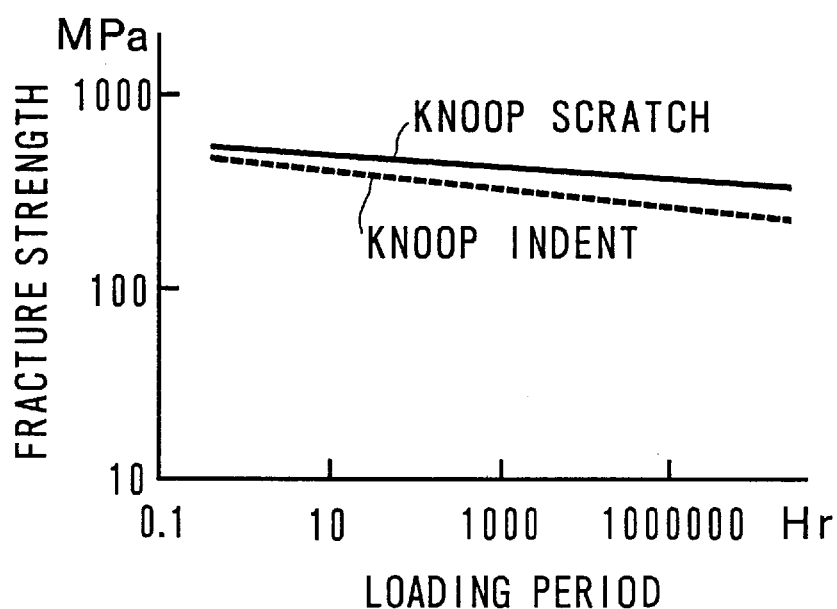
FIG. 34 is a graph showing the fracture performance of the keys formed with the Knoop indents and the linear scratches by the Knoop head with the respectively accompanying sectoral and linear cracks, in comparison in the relation between the stress factor and the period of loading.

With respect to those constructions shown in FIGS. 23–25, 27–29 and 31–33 wherein the fracture section of the ceramic key is defined by a Knoop notch accompanied by a sectoral crack formed therearound or a linear scratch formed by a Knoop head and accompanied by a linear crack, there would be an apprehension that the fracture strength of the key decreases relatively rapidly due to a growth of the sectoral crack or the linear crack under the application of loading. The keys of these constructions were tested with respect to change of fracture strength according to the period of application of load or aging. The results are shown in FIG. 34, wherein the broken line shows the performance of the keys formed with the Knoop notches accompanied by the sectoral cracks as shown in FIGS. 23–25 or 27–29, while the solid line shows the performance of the key shown in FIGS. 31–33 formed with the linear scratch by the Knoop head accompanied by the linear crack. From these test results it will be appreciated that in both constructions the reduction of fracture strength along with loading period is within a practically acceptable range. Herein it will also be appreciated that the reduction rate of the fracture strength along with loading period is slightly lower in the construction of the linear Knoop scratch with the linear crack than in the construction of the Knoop notch with the sectoral crack.

In consideration that the reduction of fracture strength along with the lapse of loading time will be at least partly caused by chemical reactions of the ceramic crystals with the moisture or halogen elements contained in the atmospheric air, particularly at the portion thereof placed under a stress concentration generated around the Knoop indent, Knoop scrathe and cracks, the ceramic key element having the construction of FIGS. 23–25 was encased. as shown in FIGS. 35–37, wherein 148 shows a resin layer formed to extend over the entire outside surface of the key 132''' and also into the Knoop indents 134'''' and 136'''' as well as into the sectoral cracks 138''' and 140'''. Such a resin coating was provided in a manner shown in FIG. 38, wherein a liquidized resin 154 was contained in a vessel 156, and the key 132''' was supported on a base 158 placed on the bottom of the vessel as completely immersed in the liquidized resin. In this condition, the Knoop head 146 was pressed into the upper surface of the key 132'''.

Figure 39:
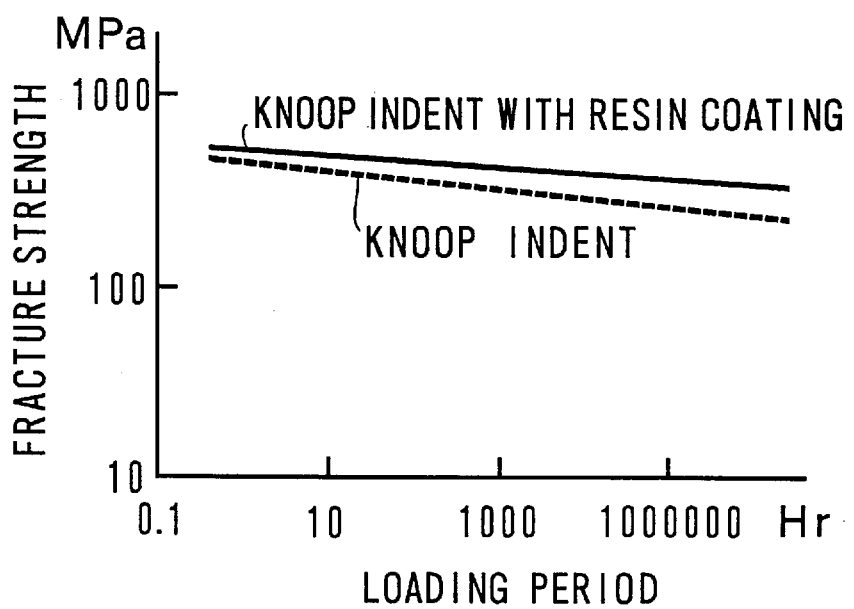
FIG. 39 is a graph showing the fracture performance of the keys formed with the Knoop indents and the accompanying sectoral cracks with and without the resin coating in comparison in the relation between the stress factor and the period of loading.
Figure 38:
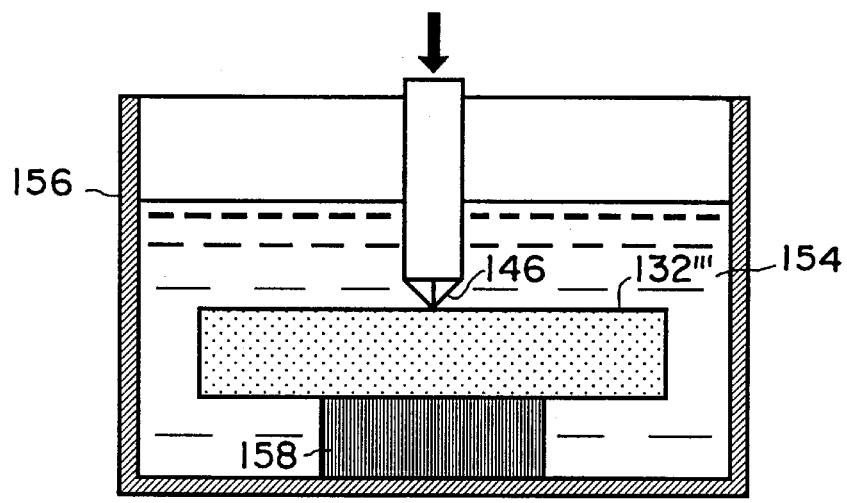
FIG. 38 shows a process of making the key shown in FIGS. 35–37 with the Knoop indents and the sectoral cracks as coated with the resin layer.

FIG. 39 shows a result of experiments carried out to confirm the effect of the resin coating provided around the key element as shown in FIGS. 35–37 according to the process shown in FIG. 38. From the result shown in FIG. 39 it will be appreciated that the resin coating contributes to improving the mechanical safety breaker according to the present invention in suppressing the reduction of fracture strength at least due to aging.

Figure 40:
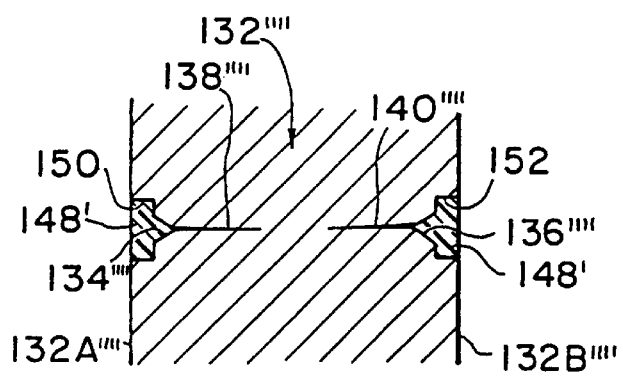
FIG. 40 is a view similar to FIG. 36, showing a cross section of a part of a key with a resin coating formed in a modified manner, traversing the linear scratches and the accompanying linear cracks.
Figure 41:
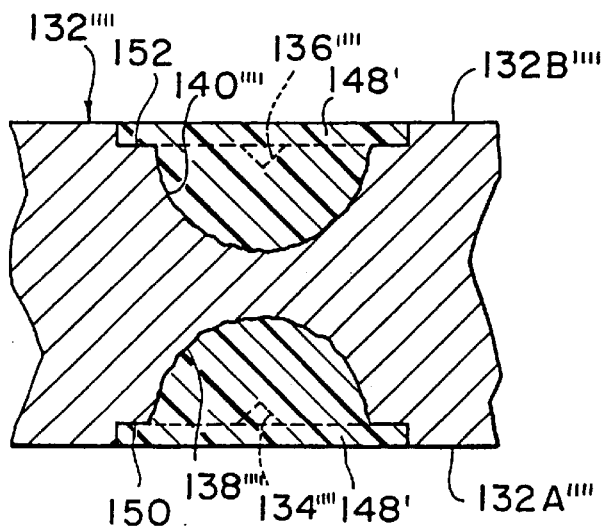
FIG. 41 is a longitudinal section of the part of the key shown in FIG. 40, taken along the linear scratches and the linear cracks.

In view of the matter that the reduction of fracture strength of the ceramic key due to chemical reactions of the ceramic crystals with the moisture or halogen elements contained in the atmospheric air will be more substantial at portions where the ceramic crystals are subjected to the stress concentration generated around the Knoop indents, the Knoop scratches and the cracks, the resin coating construction may be modified as shown in FIGS. 40 and 41, wherein the resin coating is provided only around the Knoop indents and the cracks. In this embodiment a pair of shallow grooves 150 and 152 of a rectangular cross section are formed in the opposite surfaces 132A"" and 132B"" of the ceramic key element 132"" before the knoop indents 134 and 136"" are formed together with the corresponding sectoral cracks 138"" and 140"", such that, when the resin layers have been formed around the Knoop indents 134"" and 136"" to fill the concave portions formed therearound, the resin layers are formed to have reinforcing rib portions 148' serving to stably support the resin layers covering the Knoop indents 134"" and 136"" and the sectoral cracks 138"" and 140"".

It will be apparent for those skilled in the art that the art of covering the key element as a whole or particularly the Knoop indents and the sectorally cracked portions by a resin coating may of course be applied to the key element formed with the linear scrathes formed by the Knoop head and the accompanying linear cracks to obtain the same improvement. Further, it will also be apparent that this art may also be applied to the key elements formed with the notches 34, 36, etc. for the same purpose.

Figure 42B:
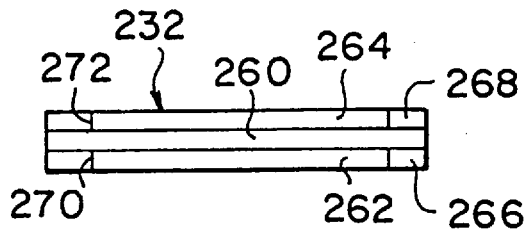
FIG. 42(A) and FIG. 42(B) show in the same manner as FIG. 23(A) and FIG. 23(B) a ceramic key according to still another embodiment in a plan view and a front view respectively, the key being formed as a bonded assembly of plate elements.
Figure 42A:
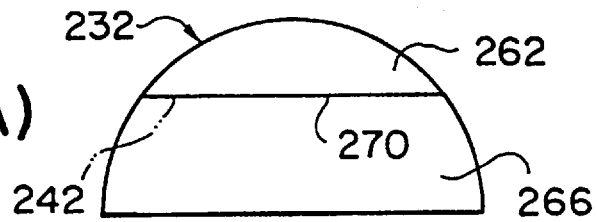
Figure 43:
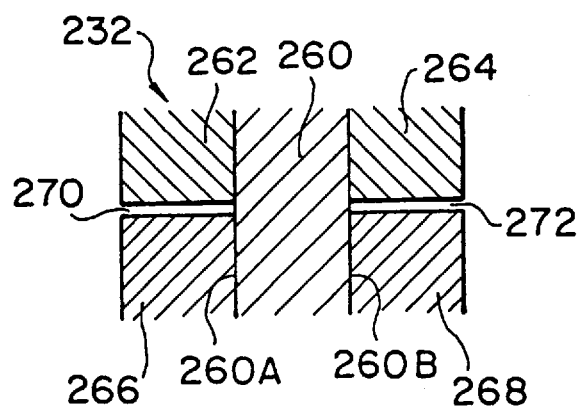
FIG. 43 is a cross section of a part of the key shown in FIG. 42(A), traversing the border of the assembled plate elements.

In order to induce the fracture of the ceramic key element along the border between the outside surface of the steering shaft and the inside surface of the annular gear as in the various embodiments described above, still another embodiment is possible as shown in FIGS. 42 and 43. In this embodiment, a sectoral ceramic key construction generally shown by 232 and having substantially the same outer configuration as the keys 32 in the former embodiments is assembled of a sectoral ceramic plate element 260 of the same sectoral contour as the keys 32 and two pairs of plate elements 262, 264 and 266, 268 attached to opposite surfaces of the plate element 260 to provide the same sectoral outside contour as the plate element 260 thereby defining linear borders 270 and 272 at opposite sides thereof along a line 242 corresponding to the linear notches 34 and 36 of the key 32 in the former embodiments. The plate elements 262, 264, 266 and 268 may desirably be also made of a ceramic material and each bonded to the plate element 260 by a bonding material having the same composition as the sintering material of the ceramic material constructing the plate element 260, the bonding being carried out by a hot static pressing process or the like. It was also confirmed that the key element of this type, when used in place of the key element 32 in the former embodiments with the border lines 270 and 272 being aligned with the clearance between the outside surface 38 of the steering shaft 10 and the inside surface 40 of the gear 18 so that the half portion sandwiched by the plate elements 262 and 264 is received in the groove 28 while the half portion sandwiched by the plate elements 266 and 268 is received in the groove 30, is fractured at a section of the plate element 260 corresponding to the border lines 270 and 272 when the torque load applied between the steering shaft 10 and the gear 18 increases beyond a determinate limit value.

Figure 44:
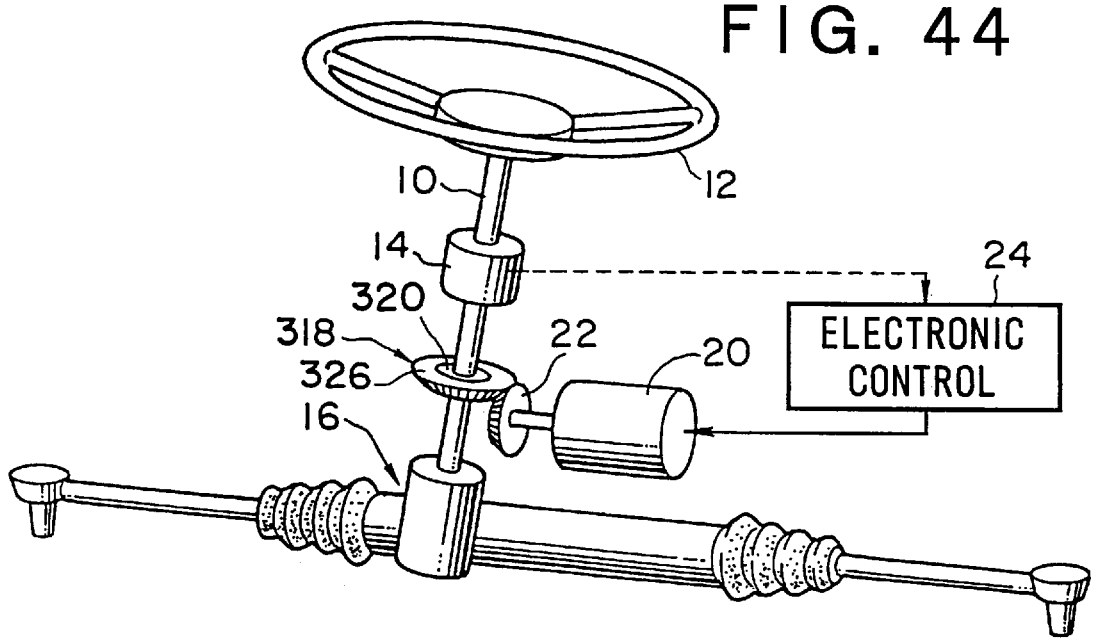
FIG. 44 is a perspective view similar to FIG. 1, showing a steering system of an automobile, incorporating still another embodiment of the mechanical safety breaker according to the present invention.
Figure 45:
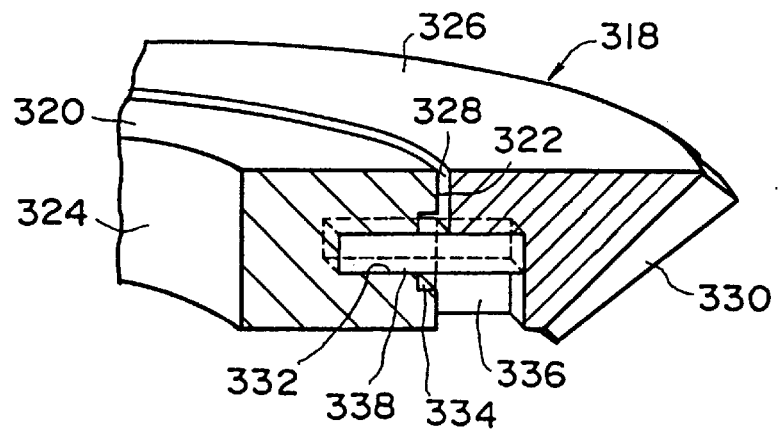
FIG. 45 is a perspective view partly in a sectional view, showing an essential portion of the gear in the steering system shown in FIG. 44.
Figure 46:
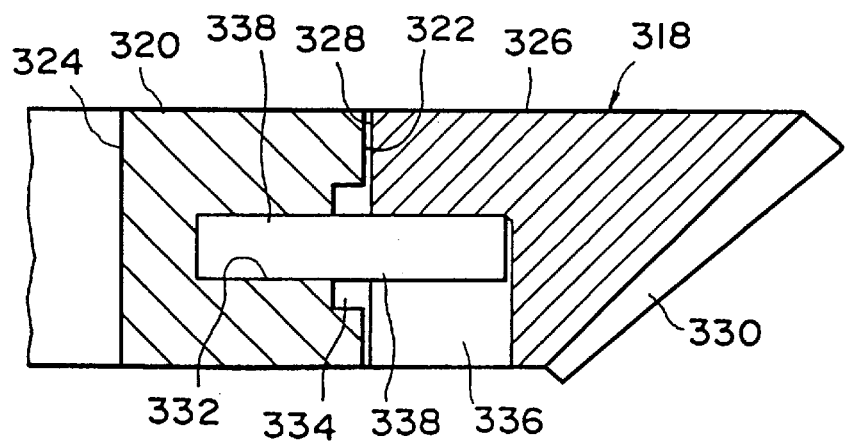
FIG. 46 is a sectional view corresponding to the sectional portion in FIG. 45, showing the essential construction in more detail.

The mechanical safety breaker employing a ceramic breaker according to the present invention may be incorporated in the power steering system having the construction schematically shown in FIG. 1, according to a modified construction slightly different from the above-mentioned embodiments, as shown in FIGS. 44–46. In this embodiment, a ceramic key is incorporated within a gear itself corresponding to the gear 18. As is shown in these figures, such a gear 318 is constructed to include an inner annular member 320 having a cylindrical outside surface 322 and a central bore 324 adapted to receive the steering shaft 10 therethrough so as to be torque-transmittingly mounted thereon, and an outer annular member 326 having a cylindrical inside surface 328 slidably engaged around the cylindrical outside surface 322 and outside gear teeth 330. The inner annular member 320 is formed with a radial key groove 332 and a port space 334 extending around the key groove 332 at an opening region thereof so as to widen the opening end portion of the key groove 332. On the other hand, the outer annular member 326 is formed with a radial key groove 336 adapted to radially oppose the key groove 332 of the inner annular member 320, the key groove 336 being also axially extended to open at one axial end of the outer annular member 326 for the convenience of assemblying the device. A ceramic key 338 having a shape of a square bar is mounted half by half in the key groove 332 of the inner annular member and the key groove 336 of the outer annular member so as to traverse the port space 334.

In this embodiment, when a torque load is applied to the gear 318', the key 338 is applied with a corresponding load which is principally a bending load concentrated at a portion thereof extending through the port space 334. The ceramic material also shows a fracture strength performance against bending which is substantially less lowered according to repetitive applications of the load than metallic material just as in the fracture strength against sheering. Therefore, by incorporating the ceramic key in a manner of being subjected to the bending load as in this embodiment, there is also obtained a mechanical safety breaker improved in the stability performance for a long period of repetitively loaded operation.

It will be apparent for those skilled in the art that a port space similar to the port space 334 may be provided at an opening end portion of the key groove 336 of the outer annular member 326 instead of or in addition to the port space 334, in order for the key 338 to operate as a bending fracture element.

Figure 47:
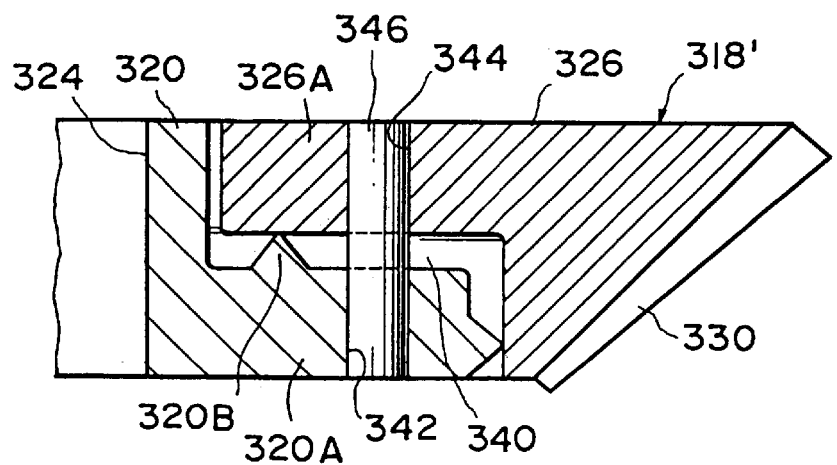
FIG. 47 is a view similar to FIG. 46, showing still another embodiment of the invention.

FIG. 47 is a view similar to FIG. 46, showing another embodiment in which a ceramic key is also used in the substantially bending mode. In this embodiment an inner annular member 320 and an outer annular member 326 corresponding to those shown in FIG. 46 are formed with axially overlapping annular portions 320A and 326A, respectively. These overlapping annular portions are substantially spaced from one another in the axial direction by an annular projection 320B to leave a substantially annular space 340 therebetween. The axially overlapping annular portions 320A and 326A are respectively formed with axial key grooves 342 and 344 adapted to oppose one another. The key grooves 342 and 344 are each cylindrical bores in this embodiment and a ceramic key 346 having a cylindrical bar configuration is mounted half by half in the key grooves 342 and 344 while traversing the space 340 at a middle portion thereof. Also in this embodiment, when a torque load is applied to the gear 318, the ceramic key 346 is subjected to a substantially bending stress concentration at the middle portion extending through the space 340, and when the torque load exceeds a determinate value, the ceramic key 346 is fractured at the portion extending through the space 340.

It will be apparent for those skilled in the art that the bending key constructions shown in FIGS. 45–47 may be modified to provide a double key construction similar to that shown in FIGS. 14–17 or a stepped key construction similar to that shown in FIGS. 18–22 such that a substantially doubled lifetime of the mechanical safety breaker is available.

Figure 48:
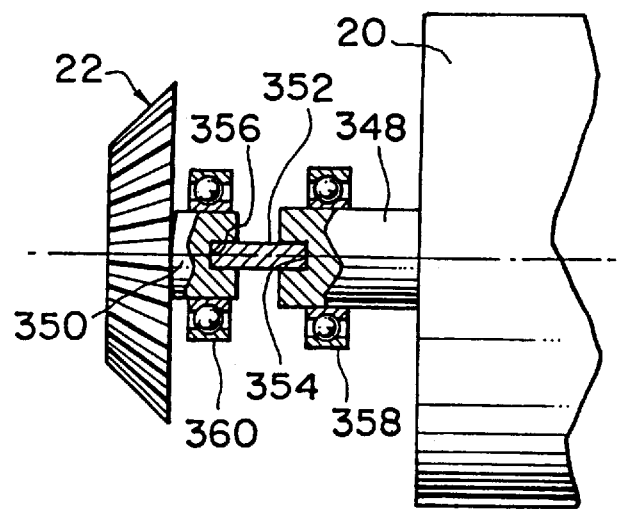
FIG. 48 is a view showing a still another embodiment of the invention according to somewhat schematic fashion.

The mechanical safety breaker employing the ceramic breaker element according to the present invention may further be constructed to load the ceramic breaker element in a manner of twisting. One such embodiment is shown in FIG. 48 in a construction incorporated in the output shaft of the motor 20 of the power steering system shown in FIG. 1.

According to this embodiment, the output shaft of the motor 20 is constructed to include a first shaft portion 348 directly connected with a rotor of the motor not shown in the figure, a second shaft portion 350 directly connected with the bevel gear 22 as coaxially aligned with the first shaft portion 348, and a ceramic key 352 torquetransmittingly connecting axially opposed end portions of the first and second shaft portions 348 and 350. The key 352 has a configuration of a rectangular plate element, and is received at opposite end portions thereof in corresponding key grooves 354 and 356 formed at the opposing end portions of the first and second shaft portions 348 and 350, respectively, so as to transmit a torque therethrough between the first and second shaft portions. The shaft portions 348 and 350 are rotationally supported by bearings 358 and 360, respectively.

When a torque load is applied between the first and second shaft portions 348 and 350 in either direction, the ceramic key 352 is twisted about a common central axis through the first and second shaft portions 348 and 350 and the gear 22, and when the torque load exceeds a determinate limit value, the ceramic key 352 is fractured by twisting. It was also confirmed that the ceramic key 352 in this construction shows a well stabilized fracture performance against repetitive applications of load as in the former embodiments in which the ceramic keys are principally subjected to sheering or bending.

Although the present invention has been described in detail in the above in the form of some preferred embodiments thereof, it will be apparent for those skilled in the art that various modifications of the shown embodiments and other embodiments are possible within the technical scope of the present invention.

We claim:

1. A power steering system for assisting steering operation of a manual steering system having a rack and pinion steering means, a steering shaft connected with the rack-and-pinion means for steering operation thereof, and a steering wheel connected with the steering shaft for driving the steering shaft in either of opposite steering directions by a driver, said power steering system comprising:

a motor for generating a force for assisting said steering operation of said manual steering system, and means for torque transmittingly connecting said motor with said manual steering system, wherein said torque transmitting connection means includes a mechanical safety breaker element for breaking the torque transmitting connection of said motor with the manual steering system when the torque transmitted exceeds a predetermined limit value, said breaker element being made substantially of a ceramic material, said ceramic material substantially maintaining its fracture strength over a relatively long period of use under repeated applications of load.

2. A power steering system according to claim 1, wherein said breaker element is a plate element adapted to transmit said force via a sheering along a cross sectional region at a middle portion thereof in a plane extension thereof.

3. A power steering system according to claim 2, wherein said cross sectional region of said plate element is defined by a pair of notches formed in opposite surfaces of said plate element to be substantially aligned to one another across the thickness thereof.

4. A power steering system according to claim 3, wherein said plate element has a sectoral configuration with said notches being formed in parallel with a straight edge thereof to traverse a middle portion of said sectoral configuration, the depth of said notches being changed along a length thereof so as to be smallest at a central portion of the length and to be largest at opposite ends of the length.

5. A power steering system according to claim 4, wherein the depth of said notches is changed arcuately so as to define arcuately convex opposite edges of said cross sectional region.

6. A power steering system according to claim 4, wherein the depth of said notches is changed straightly so as to define straightly convex opposite edges of said cross sectional region.

7. A power steering system according to claim 3, wherein said plate element has a sectoral configuration with said notches being formed in parallel with a straight edge thereof to traverse a middle portion of said sectoral configuration, the depth of said notches being substantially constant along a length thereof.

8. A power steering system according to claim 3, wherein said torque transmitting means includes first and second mechanical members wherein said first mechanical member has a cylindrical outside surface and a substantially radial first key groove opening to said cylindrical outside surface thereof, while said second mechanical member has a cylindrical inside surface to slidably engage with said cylindrical outside surface of said first mechanical member and a substantially radial second key groove opening to said cylindrical inside surface thereof and adapted to align with said first key groove, said plate element being mounted half by half in said first and second key grooves at opposite half portions thereof so as to be subjected to a sheering in the direction of thickness thereof along said cross sectional region by a relative rotational movement of said first and second mechanical members, said pair of notches being arranged such that central planes of said pair of notches join tangentially to a phantom cylindrical curve centred at a central axis of said cylindrical outside surface of said first mechanical member at bottoms of said notches so as thereby to induce a sheering fracture of said plate element along the phantom cylindrical curve.

9. A power steering system according to claim 2, wherein said cross sectional region of said plate element is defined by at least a pair of Knoop indents accompanied by corresponding sectoral cracks formed in opposite surfaces of said plate element to be substantially aligned to one another across the thickness thereof.

10. A power steering system according to claim 9, wherein said cross sectional region of said plate element is defined by at least three pairs of Knoop indents accompanied by corresponding sectoral cracks formed in opposite surfaces of said plate element, each said pair of Knoop indents and the corresponding sectoral cracks being substantially aligned to one another across the thickness thereof, while said at least three pairs of Knoop indents and the corresponding sectoral cracks being consistent to define said cross sectional region.

11. A power steering system according to claim 9, wherein said ceramic breaker element is coated with a layer of a resin.

12. A power steering system according to claim 2, wherein said plate element is an assembly of at least first, second and third plate members, at least said first plate member being made of a ceramic, said second and third plate members being bonded to a surface of said first plate member so as to define a slit therebetween to induce a fracture of said first plate member along a portion thereof aligned with said slit.

13. A power steering system according to claim 2, wherein said cross sectional region of said plate element is defined by a pair of linear scratches formed by a Knoop head to be accompanied by corresponding linear cracks formed in opposite surfaces of said plate element to be substantially aligned to one another across the thickness thereof.

14. A power steering system according to claim 1, wherein said torque transmitting means includes first and second mechanical members wherein said first mechanical member has a cylindrical outside surface and a substantially radial first key groove opening to said cylindrical outside surface thereof, while said second mechanical member has a cylindrical inside surface to slidably engage with said cylindrical outside surface of said first mechanical member and a substantially radial second key groove opening to said cylindrical inside surface thereof and adapted to align with said first key groove, said breaker element being a key mounted half by half in said first and second key grooves at opposite half portions thereof so as to transmit a torque between said first and second mechanical members around an axis corresponding to a central axis of said cylindrical outside surface of said first mechanical member.

15. A power steering system according to claim 14, wherein said first and second key grooves are each formed to define an edge at an opening end thereof which functions as a sheering edge against said key across a middle cross sectional region thereof.

16. A power steering system according to claim 14, wherein at least one of said first and second key grooves is formed with a port space for widening an opening end thereof so as to provide a space in which said key is substantially subjected to a bending stress by a torque transmitted therethrough.

17. A power steering system according to claim 14, wherein said first and second key grooves and said key received therein are provided in duplicate around said central axis such that when a first set of said key grooves and key operates to substantially transmit a torque between said first and second mechanical members, a second set of said key grooves and key idles, and when said key of said first set of said key grooves and key has been fractured, said second set of said key grooves and key operates to substantially transmit a torque between said first and second mechanical members.

18. A power steering system according to claim 14, wherein said key has a stepped thickness so as to present a relatively thicker half portion and a relatively thinner half portion such that when said thicker half portion operates to substantially transmit a torque between said first and second mechanical members, said thinner half portion idles, and when said thicker half portion has been fractured, said thinner half portion operates to substantially transmit a torque between said first and second mechanical members.

19. A power steering system according to claim 1, wherein said torque transmitting means includes first and second mechanical members wherein said first mechanical member has an annular surface adapted to turn about a rotation axis and a first key groove opening to said annular surface thereof, while said second mechanical member has an annular surface opposing said annular surface of said first mechanical member with a substantial space left therebetween and a second key groove opening to said annular surface thereof and adapted to align with said first key groove, said breaker element being a key mounted half by half in said first and second key grooves at opposite half portions thereof with a middle portion thereof traversing said space so as to transmit a torque between said first and second mechanical members around said axis of rotation.

20. A power steering system according to claim 19, wherein said first and second key grooves and said key received therein are provided in duplicate around said central axis such that when a first set of said key grooves and key operates to substantially transmit a torque between said first and second mechanical members, a second set of said key grooves and key idles, and when said key of said first set of said key grooves and key has been fractured, said second set of said key grooves and key operates to substantially transmit a torque between said first and second mechanical members.

21. A power steering system according to claim 1, wherein said torque transmitting means includes first and second mechanical members wherein said first and second mechanical members are each a rotary member adapted to rotate about a common axis of rotation as axially spaced from one another along said axis of rotation, and said breaker element is a member to connect axially opposing end portions of said first and second mechanical members with one another so as to transmit a torque therebetween by bearing a twisting load applied thereto.

22. A power steering system according to claim 1, wherein said torque transmitting means includes first and second mechanical members wherein said first mechanical member is a member to move in unison with a manual steering system of a vehicle, and said second mechanical member is a member to move in unison with an assisting steering power source of the vehicle.

\* \* \* \* \*